(12) United States Patent
Abts et al.

(10) Patent No.: US 11,917,952 B2
(45) Date of Patent: *Mar. 5, 2024

(54) IRRIGATION SYSTEM WITH STEADY STATE SPEEDS OF MOVEMENT

(71) Applicant: FIELDBOT, LLC, Newport Beach, CA (US)

(72) Inventors: Kevin J. Abts, Newport Beach, CA (US); Kim J. Jedlicka, Leigh, NE (US); Gerald L. Abts, Denver, CO (US)

(73) Assignee: FIELDBOT, LLC, Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/169,209

(22) Filed: Oct. 24, 2018

(65) Prior Publication Data

US 2019/0053443 A1 Feb. 21, 2019

Related U.S. Application Data

(63) Continuation of application No. 14/599,718, filed on Jan. 19, 2015, now Pat. No. 10,165,741, which is a continuation-in-part of application No. 13/567,185, filed on Oct. 11, 2012, now abandoned.

(51) Int. Cl.
*A01G 25/09* (2006.01)

(52) U.S. Cl.
CPC .................. *A01G 25/092* (2013.01)

(58) Field of Classification Search
CPC .............................. A01G 25/092; B60K 1/02

USPC ........................................................ 239/731
See application file for complete search history.

(56) References Cited

U.S. PATENT DOCUMENTS

| | | | |
|---|---|---|---|
| 3,807,436 A | 4/1974 | Pringle | |
| 3,823,730 A | 7/1974 | Sandstrom et al. | |
| 4,034,778 A | 7/1977 | Sage et al. | |
| 4,580,731 A | 4/1986 | Kegel et al. | |
| 5,246,164 A * | 9/1993 | McCann | A01B 79/005 |
| | | | 239/11 |
| 5,255,857 A | 10/1993 | Hunt | |
| 5,341,995 A * | 8/1994 | Leatch | A01G 25/092 |
| | | | 239/729 |
| 5,435,495 A * | 7/1995 | Davis | A01G 25/092 |
| | | | 239/726 |
| 5,678,771 A * | 10/1997 | Chapman | A01G 25/092 |
| | | | 239/727 |
| 6,007,004 A | 12/1999 | Unruh | |
| 6,036,121 A | 3/2000 | Gerdes | |
| 6,042,031 A | 3/2000 | Christensen et al. | |
| 6,045,065 A | 4/2000 | Gerdes | |

(Continued)

*Primary Examiner* — Chee-Chong Lee
(74) *Attorney, Agent, or Firm* — One LLP

(57) ABSTRACT

An irrigation system with steady state speeds of movement achieves and maintains substantial straight alignment of multiple interconnected spans with continuous movement over a range of speeds in a forward and reverse movement direction. A variable-speed drive controller monitors and processes the output of the corresponding alignment detector and, based on the output of the alignment detector, selects from memory and continuously furnishes to the corresponding span motor a predetermined progressively increasing speed profile, a predetermined progressively decreasing speed profile, or a new fixed current speed.

10 Claims, 30 Drawing Sheets

(56) References Cited

U.S. PATENT DOCUMENTS

| | | |
|---|---|---|
| 6,068,197 A | 5/2000 | Tolson |
| 6,085,999 A | 7/2000 | Gerdes et al. |
| 6,095,439 A | 8/2000 | Segal et al. |
| 6,337,971 B1 | 1/2002 | Abts |
| 6,755,362 B2 | 6/2004 | Krieger et al. |
| 6,820,828 B1 | 11/2004 | Greenwalt |
| 7,384,008 B1 | 6/2008 | Malsam |
| 7,584,053 B2 | 9/2009 | Abts |
| 8,849,468 B2 | 9/2014 | Abts et al. |
| 8,948,979 B2 | 2/2015 | Malsam |
| 9,329,580 B2 | 5/2016 | Heuert et al. |
| 9,374,949 B2 | 6/2016 | Abts et al. |
| 9,459,628 B1 | 10/2016 | Abts |
| 2002/0008167 A1 | 1/2002 | Haberland et al. |
| 2003/0066912 A1 | 4/2003 | Krieger et al. |
| 2004/0093912 A1 | 5/2004 | Krieger et al. |
| 2006/0027677 A1 | 2/2006 | Abts |
| 2007/0267524 A1 | 11/2007 | Mack |
| 2010/0032493 A1 | 2/2010 | Abts et al. |
| 2013/0018553 A1 | 1/2013 | Malsam |
| 2013/0211717 A1 | 8/2013 | Abts |
| 2013/0153752 A1 | 9/2013 | Grabow |
| 2014/0225747 A1 | 8/2014 | Abts |

* cited by examiner

IRRIGATION SYSTEM WITH STEADY STATE SPEEDS OF MOVEMENT

RELATED APPLICATIONS

The present application is a continuation of the Applicant's U.S. patent application Ser. No. 14/599,718, filed on Jan. 19, 2015, entitled "An Irrigation System With Steady State Speeds Of Movement," which was a continuation-in-part of U.S. patent application Ser. No. 13/567,185, filed on Oct. 11, 2012, and now abandoned, which is hereby incorporated by reference in its entirety.

BACKGROUND OF THE INVENTION

Field of the Invention

The present invention relates to steady state speeds of movement for irrigation systems and more particularly pertains to a new system for achieving and maintaining substantial straight alignment of the spans of an irrigation system with continuous movement over a range of speeds in a forward and reverse movement direction that minimizes or eliminates strenuous and repetitive start-and-stop movements by elements of the irrigation system.

Description of the Prior Art

Mechanized irrigation systems, such as center pivot or lateral move irrigation systems, typically employ a series of pipe spans supported above a ground surface by tower structures that may include wheels or crawler tracks mounted on the tower structures, that are driven to advance the spans about a field in either a forward movement direction or a reverse movement direction. For the purposes of the present invention, the mechanized irrigation system will be referred to as the irrigation system and the pipes and the tower structures supporting the pipes will be referred to collectively as spans. Each of the spans move relatively independently of the other spans, and the movement of the spans is often performed in a follow the leader type manner in which an end span initially advances in either a forward movement direction or reverse movement direction of the irrigation system, and the remaining intermediate spans follow thereafter.

The forward movement direction or reverse movement direction of the irrigation system is dependent on either a clockwise rotation or counter clockwise rotation of the central shafts of the rotors of the span motors connected to reduction gearboxes that drive the rotation of the wheels contacting the ground surface. The direction of the rotation of the central shafts of the rotors of the span motors are conventionally controlled by conductors supplying power, typically, 3-phase, 480 volt AC (alternating current), to the span motors. Conventional 3-phase induction motors provide inherently high starting torques and high efficiency in operation, typically at 60 Hz (cycles per second), on irrigation systems of the prior art and such motors may also be used as the 3-phase span motors of the present invention.

In the case of 3-phase span motors as conventionally used on center pivots, such span motors typically operate at a fixed span motor RPM (revolutions per minute) of approximately 1,750. Gear reduction is provided to achieve a pace of movement over the ground of the wheels of about 0.8 wheel RPM. Such span motors can also easily be reversed (e.g., clockwise rotation of the central shafts of the rotors of the span motors to counterclockwise rotation of the central shafts of the rotors of the span motors). Reversal of the rotation of the central shafts of the rotors of the span motors is accomplished by simply reconfiguring the connections of any two of the three conductors L1, L2, L3 of the 3-phase supply power using a conventional electromechanical contactor device, typically located at a central control panel (not shown). This feature of 3-phase motors facilitates selecting a clockwise rotation or counter clockwise rotation of the central shafts of the rotors of the span motors, and, in turn, selecting either a forward movement direction or reverse movement direction of the irrigation system. A change in either the forward movement direction or reverse movement direction of the irrigation system is controlled conventionally for both the prior art and for the system of the present invention by simply reconfiguring the connections of any two of the three conductors L1, L2, L3 of the 3-phase supply power.

Another convention of irrigation systems for the prior art is the use fixed-speed drive assemblies that may include an alignment detector with one or more single-pole, double-throw (SPDT) switches that are wired to receive either a forward movement direction signal or a reverse movement direction signal depending on either a forward movement direction or a reverse movement direction. These typical SPDT switches control the span motors of the fixed-speed drive assembly on and off while the irrigation system is moving in either a forward movement direction or a reverse movement direction. The discrete forward and reverse movement direction signals are communicated to the switches that each serve to signal two distinct states of alignment to control the 3-phase span motors on and off using a fixed-speed drive controller (e.g., electromechanical contactor or motor starter) of the fixed-speed drive assembly. Such forward and reverse movement direction signals are typically communicated to the switches using separately configured circuits as compared to the three conductors L1, L2, L3 of the 3-phase supply power that are configured to supply electrical power to the span motors.

In an example of the prior art, a forward movement direction signal may be present in a forward movement direction, and a reverse direction signal may be present in a reverse movement direction. In operation, conventional center pivot controls include both a forward movement direction signal and a reverse movement direction signal; however, only one of the two movement direction signals is present in a respective movement direction. Furthermore, the respective forward movement direction signal and reverse movement direction signal are each typically configured to cause the switches to signal the fixed-speed drive controller to control the span motors on and off in an opposite manner with regard to maintaining span alignment. For example, with the same state of alignment, a forward movement direction signal may be configured by the fixed-speed drive controller to control the span motor on and a reverse movement direction signal may be configured by the fixed-speed drive controller to control the span motor off.

The span motor of an intermediate span is typically controlled from span motor on to span motor off and span motor off to span motor on by a fixed-speed drive controller that monitors the output of the corresponding alignment detector that may include a single-pole, double-throw switch. Conventionally, in the prior art, the span motor RPM is not varied other than when the span motor is controlled from span motor on to span motor off and span motor off to span motor on. Such switch signals a discrete (i.e., binary logic, or two-state) on/off signal switch state to cycle control the span motor in an on/off manner. The switch may be located at spans adjacent to the flexible junctures where adjacent spans are interconnected. Relative movement of adjacent spans actuates these switches and, for example, enables the signaling of two distinct states of alignment of adjacent interconnected spans, such as that caused by the forward movement of an outer span about the flexible juncture of two adjacent spans. For example, the wheels of a lagging intermediate tower structure are driven in a forward movement direction by the rotation of one or more cams, rotated by one or more rods (e.g., mechanical linkage), that rotate against the roller-actuating arm of a corresponding switch that causes the internal contacts of the respective switch to close in a conventional single-pole, double-throw method that results in an "on" signal switch state controlling the 3-phase span motor on. Furthermore, in this example, the supply power supplied to the span motor is configured to rotate the central shaft of the rotor of such span motor in a clockwise rotation and, thereby, the span is driven in a forward movement direction by a respective fixed-speed drive assembly until a substantial straight alignment is restored between the adjacent spans (i.e., respective intermediate tower structure not lagging and not leading). The switches signal two distinct states of alignment based on either a forward movement direction or a reverse movement direction and on a closed switch contact or an opened switch contact that results in either a span motor "on" control or a span motor "off" control.

The fixed-speed drive assemblies incorporating the span motors are, therefore, alternately and repeatedly controlled on and controlled off by way of a discrete "on" signal switch state or "off" signal switch state. The wheels of the intermediate tower structures may each be driven in either a forward movement direction or a reverse movement direction at a uniform speed with closed switch contacts and stopped with opened switch contacts. This process is repeated by each successive intermediate tower structure of the irrigation system until all of the spans are brought into substantial straight alignment. Each time an intermediate tower structure is advanced in either a forward movement direction or a reverse movement direction, a new distinct state of alignment is signaled by the corresponding switch and the process is repeated.

In center pivot irrigation systems, the radially-outermost tower structure or end tower structure typically leads the movement of the spans of the irrigation system, while in a lateral move irrigation system either one of the end tower structures typically leads the movement of the spans of the irrigation system. In a center pivot irrigation system, the outermost or end span wheel track has the largest circumference; and, therefore, the end span has the farthest distance to travel. In the systems of the prior art the intermediate spans, having relatively smaller wheel track circumferences, can always keep up with the speed of the end span while using substantially the same fixed-speed span motors, assuming similar wheel tire sizes and gearing ratios.

This conventional manner of movement and substantial straight alignment of the spans of irrigation systems requires countless starts-and-stops by the intermediate tower structures, and the corresponding fixed-speed drive assemblies that move them. The number of repeated on-and-off control cycles of the corresponding span motor providing the movement for a respective intermediate tower structure can exceed one thousand a day during continuous operation. This repeated on-and-off control cycling of the corresponding span motors, which is repeated every day, all day, that the irrigation system is operating, causes excessive wear on the electrical components, structural components, and mechanical parts of the fixed-speed drive assembly, especially the span motors, knuckles and gearboxes transferring power to the wheels.

To mitigate the stress on the irrigation system caused by the repetitive start-and-stop movement of fixed-speed drive assemblies typically utilizing alignment detectors as discussed above, movement control systems have been proposed to provide a relatively smooth and continuous movement of the intermediate spans and their respective intermediate tower structures. These continuous movement control systems typically employ potentiometers or other analog sensors, such as capacitive displacement sensors, strain gauge sensors, non-contact proximity sensors or other devices capable of quantifiably measuring a precise degree of span alignment. Analog alignment sensor signals vary in magnitude in direct correlation or proportion to the degrees of deviation in alignment of one span with respect to adjacent interconnected spans. Such analog alignment sensor signals are monitored and processed by variable-speed drive controllers configured to vary aspects of the supply power (i.e., vary the speed) furnished to the corresponding span motor. This, in turn, varies the span motor RPM that, in turn, varies the RPM of the wheels in response to changing analog alignment sensor signals. These analog type sensors are in lieu of typical rod and switch actuators and cams or similar discrete signaling devices that merely use a switch to signal if the state of alignment is beyond a preset maximum value, as is the case with the conventional systems of the prior art for center pivot irrigation system movement control systems.

The variations in the magnitude or intensity of analog sensor signals are monitored and processed by variable-speed drive controllers that, in turn, vary aspects of the supply power (i.e., vary the speed) furnished to the corresponding span motors turning the wheels of the intermediate tower structures in substantially direct correlation or proportion to the degrees of deviation in alignment as detected and outputted by the analog sensors, such that detection of greater angles of deviation in alignment of the interconnected spans results in relatively faster span motor speeds, and detection of relatively lower angles of deviation in alignment results in relatively slower span motor speeds. Such means of varying span motor speeds in direct proportion to the degrees of deviation in alignment as detected and outputted by the analog sensors (i.e., the selected speed of the variable-speed drive controller is based upon the alignment) to maintain substantial straight alignment of the spans with continuous movement requires the span motors to constantly transition between faster speeds and slower speeds (i.e., transient state speeds of movement) as opposed to evolving to unchanging fixed-speeds (i.e., steady state speeds of movement).

Krieger (U.S. Pat. No. 6,755,362), Malsam (U.S. Patent App. Pub. No. 2013/0018553) and Grabow (U.S. Patent App. Pub. No. 2013/0253752) have proposed to provide a relatively smooth and continuous movement and substantial straight alignment of spans using potentiometers or other analog sensors or, in the case of Grabow, GPS (global positioning system) data is used as a means of generating analog alignment sensor signals for varying span motor speeds in direct proportion to the degrees of deviation in alignment.

SUMMARY OF THE INVENTION

The present invention discloses an irrigation system that is configured to maintain substantial straight alignment of the spans of an irrigation system with continuous movement over a range of speeds in a forward and reverse movement direction. The present irrigation system includes multiple interconnected spans that are supported by multiple tower structures. Each intermediate tower structure may include a variable-speed drive assembly that may include a variable-speed drive controller that varies aspects of the supply power (i.e., varies the speed) furnished to the corresponding span motor to control the speed of movement of the respective variable-speed drive assembly in either a forward movement direction or a reverse movement direction, such variable-speed drive controller selecting from memory and continuously furnishing to the corresponding span motor a predetermined progressively increasing speed profile, a predetermined progressively decreasing speed profile, or a new fixed current speed so as to maintain span alignment. The predetermined progressively increasing speed profiles and predetermined progressively decreasing speed profiles consist of one or more rates of change in speed over time as opposed to a selected speed. The variable-speed drive assembly associated with each corresponding intermediate span includes an alignment detector configured to detect and output three distinct states of alignment. Such alignment detector may include a conventional first switch one having two signal switch one states, such as disclosed in the systems of the prior art, to provide either an "on" signal switch one state or an "off" signal switch one state and, in addition to the systems of the prior art, may include a second switch two also having two signal switch two states to provide either an "on" signal switch two state or an "off" signal switch two state, but in an opposite manner to first switch one. For both switch one and switch two, the respective "on" signal switch states and the "off" signal switch states, monitored and processed by the variable-speed drive controller, are based on four distinct states of alignment (i.e., a lagging state of alignment, a non-lagging state of alignment, a leading state of alignment, and a non-leading state of alignment) of adjacent intermediate spans in either a forward movement direction or a reverse movement direction.

In operation, the rotation of a cam against each respective roller-actuating arm one of switch one and roller-actuating arm two of switch two is configured in an opposite manner such that the roller-actuating arm one may cause the internal contacts of the corresponding switch one to open and close in a conventional single pole, double throw method, and, similarly, the roller-actuating arm two may cause the internal contacts of the corresponding switch two to open and close in a conventional single pole, double throw method, but in an opposite manner to the internal contacts of switch one.

In an embodiment of the present invention, both switch one and switch two of the "dual switch" alignment detector may be conventional and typical of the switch types used with electric-drive center pivot irrigation systems that utilize conventional span motors in conjunction with conventional, "single" switch, repetitive start-and-stop movement control systems. For the conventional systems of the prior art, a "single switch" alignment detector with a single switch one is typically incorporated into each fixed-speed drive assembly of each intermediate tower structure and such conventional switch one is in communication with a respective fixed-speed drive controller configured to repeatedly on-and-off control cycle the corresponding span motor to maintain substantial straight alignment of the spans of the irrigation system.

In the prior art, a switch one is typically incorporated into each alignment detector of each fixed-speed drive assembly and is in communication with a fixed-speed drive controller configured to repeatedly on-and-off control cycle the corresponding span motor to maintain substantial straight alignment of the spans of the irrigation system with transient state speeds of movement (i.e., span motor on to span motor off and span motor off to span motor on). In an embodiment of the present invention, the alignment detector of the variable-speed drive assembly may utilize the same switch one, as described in the prior art, with an additional switch two, but wired in an opposite manner, to communicate the "on" and "off" signal switch one states and "on" and "off" signal switch two states to a variable-speed drive controller. With the additional switch two having two signal switch two states, the "dual switch" alignment detector is now capable of detecting at least three distinct states of alignment as opposed to prior art systems only being capable of detecting two distinct states of alignment as in the prior art. Both switch one and switch two of the alignment detector of the present invention may be conventional and typical of the switch one type used with electric-drive center pivot irrigation systems that utilize span motors in conjunction with conventional repetitive start-and-stop movement control systems.

In a preferred embodiment, the variable-speed drive controller of the present invention monitors and processes the output of the corresponding "dual switch" alignment detector and, based on the output of the alignment detector, selects from memory and continuously furnishes to the corresponding span motor a predetermined progressively increasing speed profile (e.g., in either a lagging state of alignment or a non-leading state of alignment), a predetermined progressively decreasing speed profile (e.g., in either a leading state of alignment or a non-lagging state of alignment), or a new fixed current speed (e.g., in both a non-lagging state of alignment and a non-leading state of alignment) (i.e., the selected predetermined progressively increasing speed profiles, the selected predetermined progressively decreasing speed profiles, and the selected new fixed current speeds of the variable-speed drive controller are based upon the alignment). In particular, the variable-speed drive controller continuously furnishes to the corresponding span motor a predetermined progressively increasing speed profile, a predetermined progressively decreasing speed profile, or a new fixed current speed. Thus, the variable-speed drive controller progressively increases the speed of the span motor in a predetermined manner over time, progressively decreases the speed of the span motor in a predetermined manner over time, or maintains a new fixed current speed of the span motor so as to maintain substantial straight alignment of the spans of the irrigation system with constantly evolving steady state speeds of movement (i.e., the span motor evolves to a new fixed current span motor speed from the most current progressively increasing span motor speed and evolves to a new fixed current span motor speeds from the most current progressively decreasing span motor speed and eventually achieves a steady state of speed of movement that ultimately maintains both a non-lagging state of alignment and a non-leading state of alignment for each respective span).

Prior art includes conventional repetitive start-and-stop movement control systems, wherein "on" and "off" signal switch one states are outputted by an alignment detector to a fixed-speed drive controller that, in turn, repeatedly on-and-off control cycles the corresponding span motors. Significantly, the present invention may use an alignment detector with the same switch one to output the same "on" signal switch one states and "off" signal switch one states, but to a variable-speed drive controller that, in addition, is also monitoring and processing the output of additional "on" signal switch two states and "off" signal switch two states of the same alignment detector. In other words, the present invention uses the same switch one to provide the same "on" signal switch one states and "off" signal switch one states to a variable-speed drive controller, but uses such "on" signal switch one states and "off" signal switch one states in combination with a similar switch two to provide additional "on" signal switch two states and "off" signal switch two states to be outputted by the alignment detector to a corresponding variable-speed drive controller for a total of four signal switch states, two from each switch. The variable-speed drive controller, in turn, monitors and processes the output of the corresponding alignment detector and, based on the output of the alignment detector, selects from memory and continuously furnishes to the corresponding span motor a predetermined progressively increasing speed profile, a predetermined progressively decreasing speed profile, or a new fixed current speed.

This, in turn, progressively increases the span motor speed in a predetermined manner over time, progressively decreases the span motor speed in a predetermined manner over time, or maintains a new fixed current speed of the span motor over time so as to maintain substantial straight alignment of the spans of the irrigation system with constantly evolving steady state speeds of movement. In contrast, the repetitive start-and-stop movements of the prior art maintain substantial straight alignment of the spans of the irrigation system with transient state speeds of movement while never evolving to preferred steady state speeds of movement.

A significant improvement in operation of irrigation systems by the system of the present invention as compared to the prior art is the system of enabling steady state speeds of movement rather than transient state speeds of movement as required by conventional repetitive start-and-stop movement control systems as well as all other continuous movement control systems discussed herein. Furthermore, in the system of the present invention, the new fixed current speeds eventually evolve to steady state speeds of movement of the variable-speed drive assemblies of each respective intermediate tower structure as the corresponding variable-speed drive controller selects from memory and continuously furnishes a predetermined progressively increasing speed profile followed by a new fixed current speed and a predetermined progressively decreasing speed profile followed by a new fixed current speed. Such new fixed current speeds eventually evolve to distinct steady state speeds of movement of the variable-speed drive assemblies of each respective intermediate tower structure that achieve and maintain alignment among a plurality of respective intermediate spans without the need for constantly transitioning speeds or transient state speeds of movement as with the repetitive start-and-stop movement control systems of the prior art as well all other continuous movement control systems.

It should be noted that both the conventional repetitive start-and-stop movement control systems of the prior art and all other continuous movement control systems serve to maintain substantial straight alignment of the spans of an irrigation system with transient state speeds of movement. The present invention, however, further maintains both continuous movement and substantial straight alignment of the spans of an irrigation system with steady state speeds of movement over a range of speeds in a forward and reverse movement direction without transient state speeds of movement or the strenuous and repetitive start-and-stop movements of the prior art that result from repeated on-and-off control cycling of the corresponding span motors.

BRIEF DESCRIPTION OF THE DRAWINGS

The detailed description is described with reference to the accompanying figures.

DETAILED DESCRIPTION OF THE INVENTION

Figure 1A:
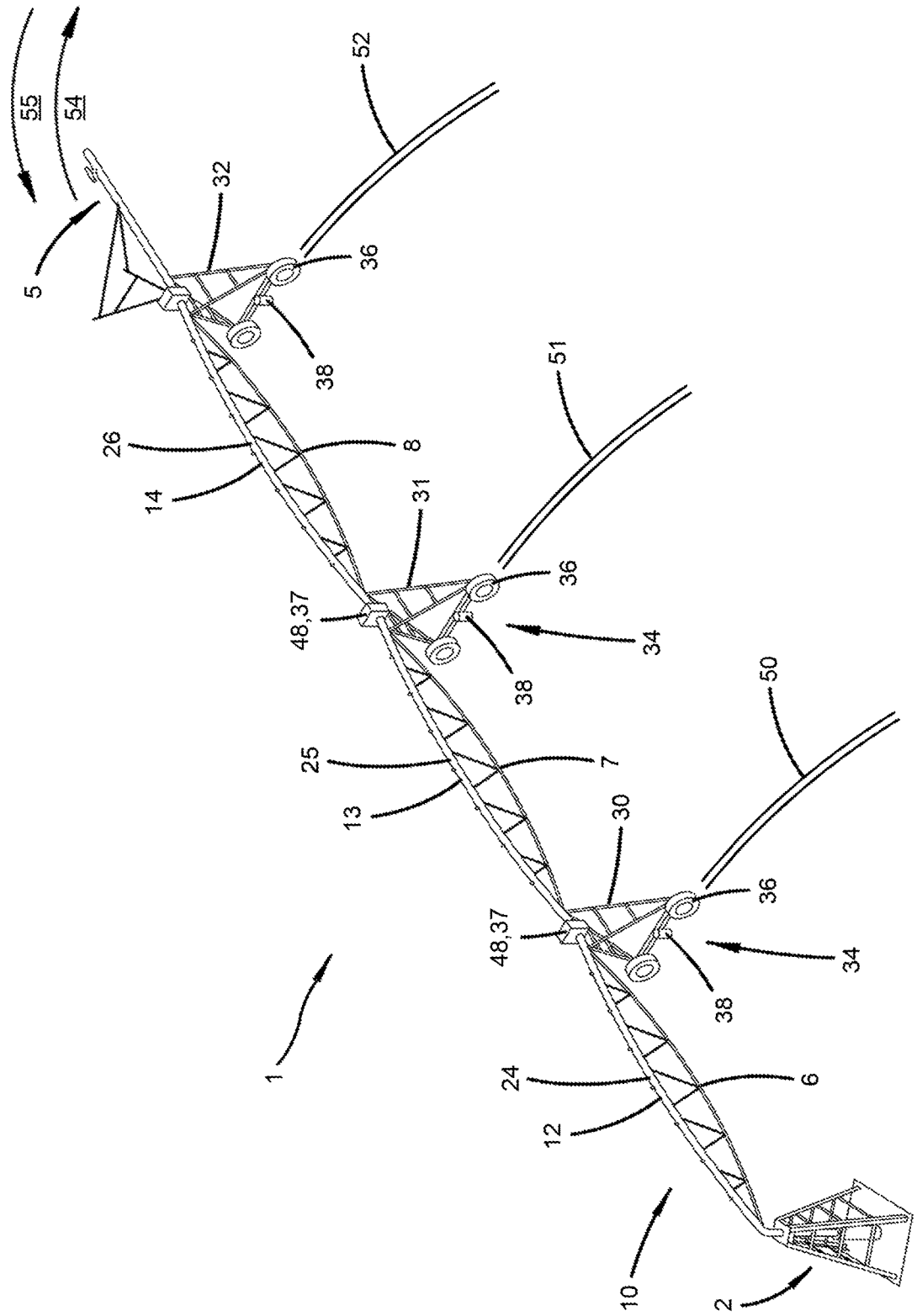
FIG. 1A is an isometric diagrammatic perspective view of an irrigation system in accordance with an example implementation of the prior art.

Overview.

Irrigation systems, such as center pivot irrigation systems, generally include fixed-speed drive assemblies at each of the intermediate tower structures to propel the irrigation systems over a respective ground surface, cultivation area or field. Such irrigation systems rely on span motors with fixed-rate speeds of the central shafts of the rotors of such span motors due to their relative simplicity and robustness. Such systems, however, can only adjust the relative alignment of various span portions by repeatedly on-and-off control cycling the corresponding span motors as roving spans change states of alignment in either a forward movement direction or a reverse movement direction. This results in each intermediate tower structure coming to a complete stop and then requiring a large impulse of power to the span motor to start the intermediate tower structure moving again. These strenuous and repetitive start-and-stop movements that result from repeated on-and-off control cycling of the corresponding span motors can result in excessive stress on structures, wear on components, and downtime of the irrigation system. The irregular motion caused by these strenuous and repetitive start-and-stop movements in order to maintain a substantial straight alignment of the spans can also cause uneven application of irrigation water and/or chemicals to the field. This results in waste of both water and chemicals. The irregular motion can also cause deviations in alignment or errors in determining the position of the end of the machine. This can result in errors in operations based on position.

Accordingly, an irrigation system with steady state speeds of movement is disclosed that is configured to maintain a substantial straight alignment among multiple adjacent spans without the irregular motion caused by the strenuous and repetitive start-and-stop movements wherein span motors are repeatedly control cycled between span motor on and span motor off as described above. In an implementation, an irrigation system includes multiple interconnected spans that are supported by multiple tower structures. Each intermediate tower structure may include a variable-speed drive that may include a variable-speed drive controller that varies aspects of the supply power (i.e., varies the speed) furnished to the corresponding span motor to control the speed of movement of the respective variable-speed drive assembly in either a forward movement direction or a reverse movement direction, such variable-speed drive controller selecting from memory and continuously furnishing to the corresponding span motor a predetermined progressively increasing speed profile or a predetermined progressively decreasing speed profile so as to maintain span alignment. Such predetermined speed profiles may consist of one or more rates of change in speed over time (e.g., ramp up speed, ramp down speed, step up speed, step down speed, etc.).

In an embodiment of the present invention, each variable-speed drive assembly of the intermediate spans of the irrigation system may include an alignment detector configured to detect and output three distinct states of alignment. Such alignment detector may include a switch one having two signal switch one states with a roller-actuating arm one and a switch two having two signal switch two states with a roller-actuating arm two that are each actuated by the rotational movement of a cam connected to a rod associated with a corresponding intermediate span to signal four distinct states of alignment of the corresponding span with respect to an adjacent span. Within each variable-speed drive assembly, an alignment detector with a corresponding switch one and a corresponding switch two is in communication with a corresponding variable-speed drive controller. Each variable-speed drive controller is configured to monitor and process the output of the corresponding alignment detector and, based on the output of the alignment detector, to select from memory and continuously furnish to the corresponding span motor a predetermined progressively increasing speed profile, a predetermined progressively decreasing speed profile, or a new fixed current speed so as to maintain the interconnected spans in a substantially linear orientation to the respective longitudinal axes of the spans (e.g., maintain substantial straight alignment of the spans with respect to each other).

Similarly, such new fixed current speeds may be equal to the speed currently being furnished by the variable-speed drive controller to the corresponding span motor at the exact moment when a predetermined progressively increasing speed profile or a predetermined progressively decreasing speed profile changes to a new fixed current speed.

As disclosed by the present invention, the variable-speed drive controller selects from memory and continuously furnishes to the corresponding span motor a new fixed current speed each time a predetermined progressively increasing speed profile or a predetermined progressively decreasing speed profile causes a change in the state of alignment, as detected and outputted by the alignment detector, between two adjacent spans. In reaction to span movements resulting from the variable-speed drive controller selecting from memory and continuously furnishing to the corresponding span motor predetermined progressively increasing speed profiles followed by a new fixed current speed and predetermined progressively decreasing speed profiles followed by a new fixed current speed, the rotation of one or more cams, rotated by one or more rods, actuates either or both the roller-actuating arm one of switch one and the roller-actuating arm two of switch two. The variable-speed drive controller monitors and processes the output of the corresponding alignment detector (i.e., signal switch one states and signal switch two states).

A significant and unique improvement in operation of irrigation systems by the system of the present invention as compared to the repetitive start-and-stop movement control systems of the prior art as well as all other continuous movement control systems, is the evolving of steady state speeds of movement rather than constantly transitioning or transient state speeds of movement from span motor on to span motor off and span motor off to span motor on, as required by the repetitive start-and-stop movement control system of the prior art, or from slower span motor speeds to faster span motor speeds and faster span motor speeds to slower span motor speeds, as required by all other continuous movement control systems discussed herein. In the system of the present invention, the new fixed current speeds eventually evolve to steady state speeds of movement of the variable-speed drive assemblies of each respective intermediate tower structure as the corresponding variable-speed drive controller selects from memory and continuously furnishes to the corresponding span motor a predetermined progressively increasing speed profile followed by a new fixed current speed and a predetermined progressively decreasing speed profile followed by a new fixed current speed. Such new fixed current speeds eventually evolve to distinct steady state speeds of movement of the variable-speed drive assemblies of each respective intermediate tower structure that achieve and maintain alignment among a plurality of respective intermediate spans without the need for constantly transitioning speeds or transient state speeds of movement as with the repetitive start-and-stop movement control systems of the prior art as well all other continuous movement control systems.

In an embodiment, each variable-speed drive assembly of the irrigation system may include a switch one and a switch two that may each be simultaneously and individually actuated by the rotational movement of one or more cams against a respective roller-actuating arm one of switch one and a respective roller-actuating arm two of switch two to signal distinct states of alignment of the corresponding span with respect to an adjacent span. Within each variable-speed drive assembly, such switch one and switch two of a respective alignment detector may each be in communication with a corresponding variable-speed drive controller. Each variable-speed drive controller may be configured to monitor and process "on" signal switch one state, "off" signal switch one state, "on" signal switch two state, and "off" signal switch two state data and use such processed "on" signal switch one state, "off" signal switch one state, "on" signal switch two state, and "off" signal switch two state data to select from memory and continuously furnish to the corresponding span motor a predetermined progressively increasing speed profile, a predetermined progressively decreasing speed profile, or a new fixed current speed so as to maintain the interconnected spans in a substantially linear orientation to the respective longitudinal axes of the spans (e.g., maintain substantial straight alignment of the spans with respect to each other).

Prior Art.

FIG. 1A illustrates a self-propelled (e.g., mechanized) irrigation system 1 in accordance with an embodiment of the prior art. Examples of self-propelled irrigation systems include a center pivot irrigation system 1, a linear move irrigation system (not shown), or the like. FIG. 1A illustrates an embodiment of the prior art wherein the irrigation system 1 is a center pivot irrigation system. As shown, the irrigation system 1 may include a center pivot point structure 2, a main section assembly 10 (irrigation section assembly) coupled (e.g., connected) to the center pivot point structure 2. The center pivot point structure 2 has access to a water source to furnish water to the irrigation system 1.

Figure 2A:
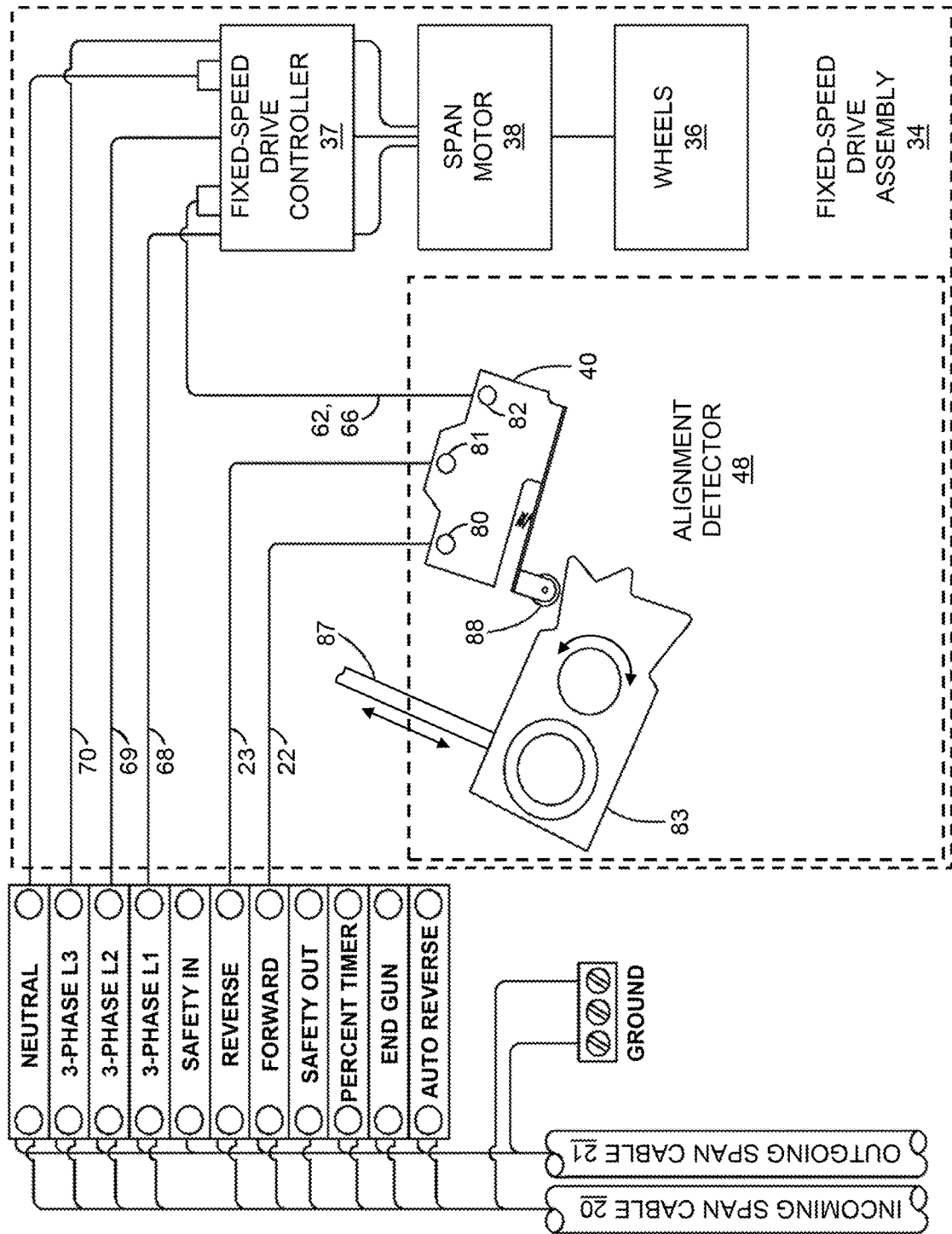
FIG. 2A is a schematic diagram illustrating the selected elements of the fixed-speed drive assembly of the irrigation system shown in FIG. 1A in accordance with an example implementation of the prior art.

FIG. 2A illustrates a fixed-speed drive assembly 34 typical of conventional irrigation systems 1. Each fixed-speed drive assembly 34 may include an alignment detector 48 (including a switch one 40 with a roller-actuating arm one 88, a normally closed switch one contact 80, a normally opened switch one contact 81, and a common switch one contact 82, a cam 83, and a rod 87), a span motor 38, wheels 36, and a fixed-speed drive controller 37. The fixed-speed drive controller 37 typically used in the prior art is an electromechanical contactor or motor starter that controls the repeated on-and-off control cycling of each corresponding span motor 38, such repeated on-and-off control cycling of each corresponding span motor 38 being necessary to achieve and maintain substantial straight alignment of the spans and speed of movement in either a forward movement direction 54 or a reverse movement direction 55 while the irrigation system 1 is operating.

Figure 3A:
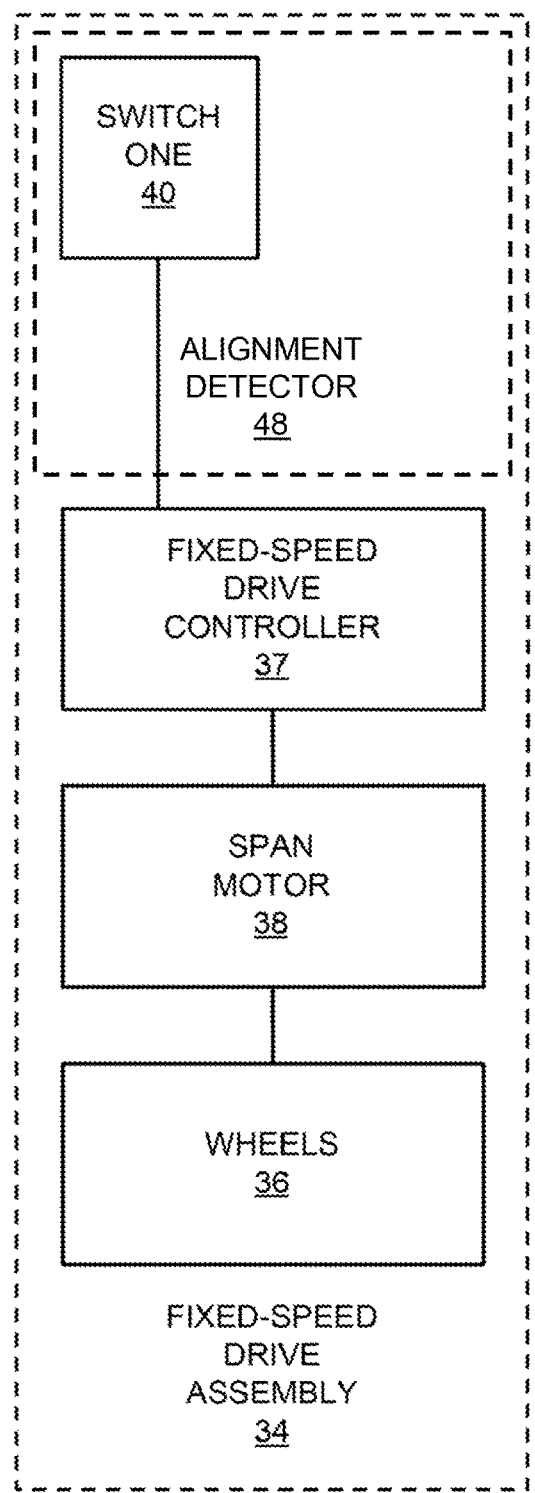
FIG. 3A is a block diagram illustrating the selected elements of the fixed-speed drive assembly of the irrigation system shown in FIG. 1A in accordance with an example implementation of the prior art.

FIG. 3A is a block diagram illustrating selected elements of the fixed-speed drive assembly 34 of the irrigation system 1 shown in FIG. 1A in accordance with an example implementation of the prior art.

Figure 4A:
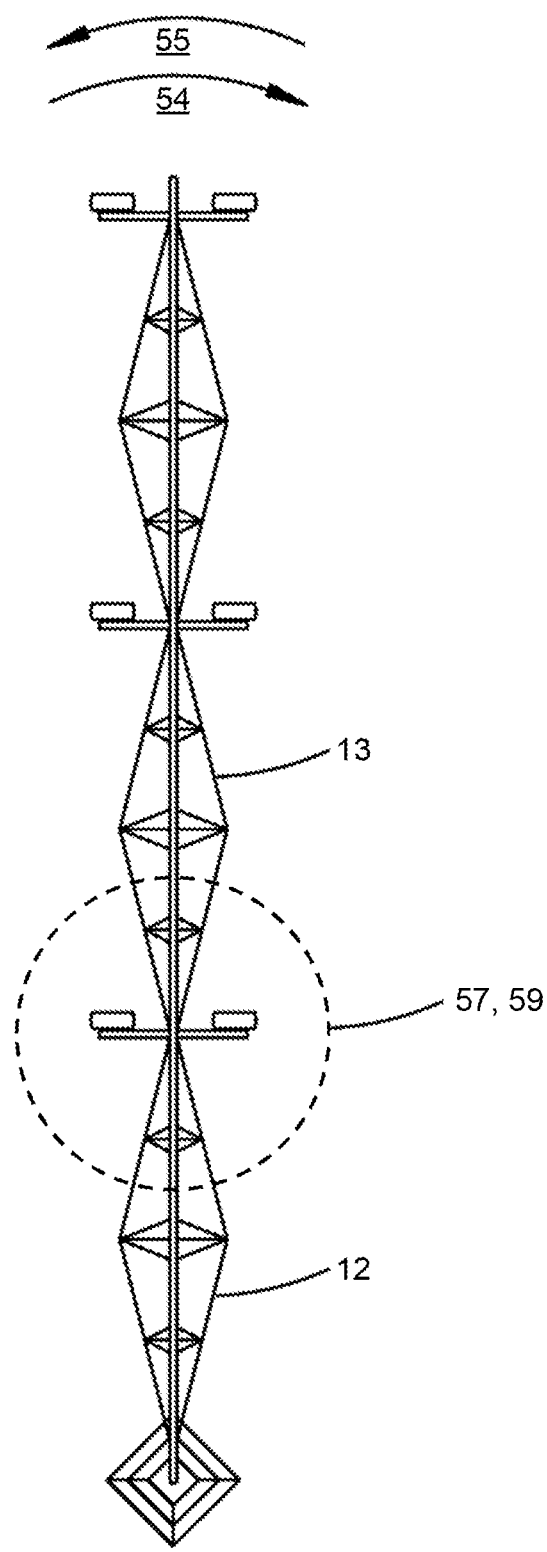
FIG. 4A is an illustration of the respective longitudinal axes of the spans of an irrigation system shown in FIGS. 1A and 1B in substantial straight alignment in either a forward movement direction or a reverse movement direction in accordance with an example implementation of the prior art and with an example implementation of the present invention.
Figure 4B:
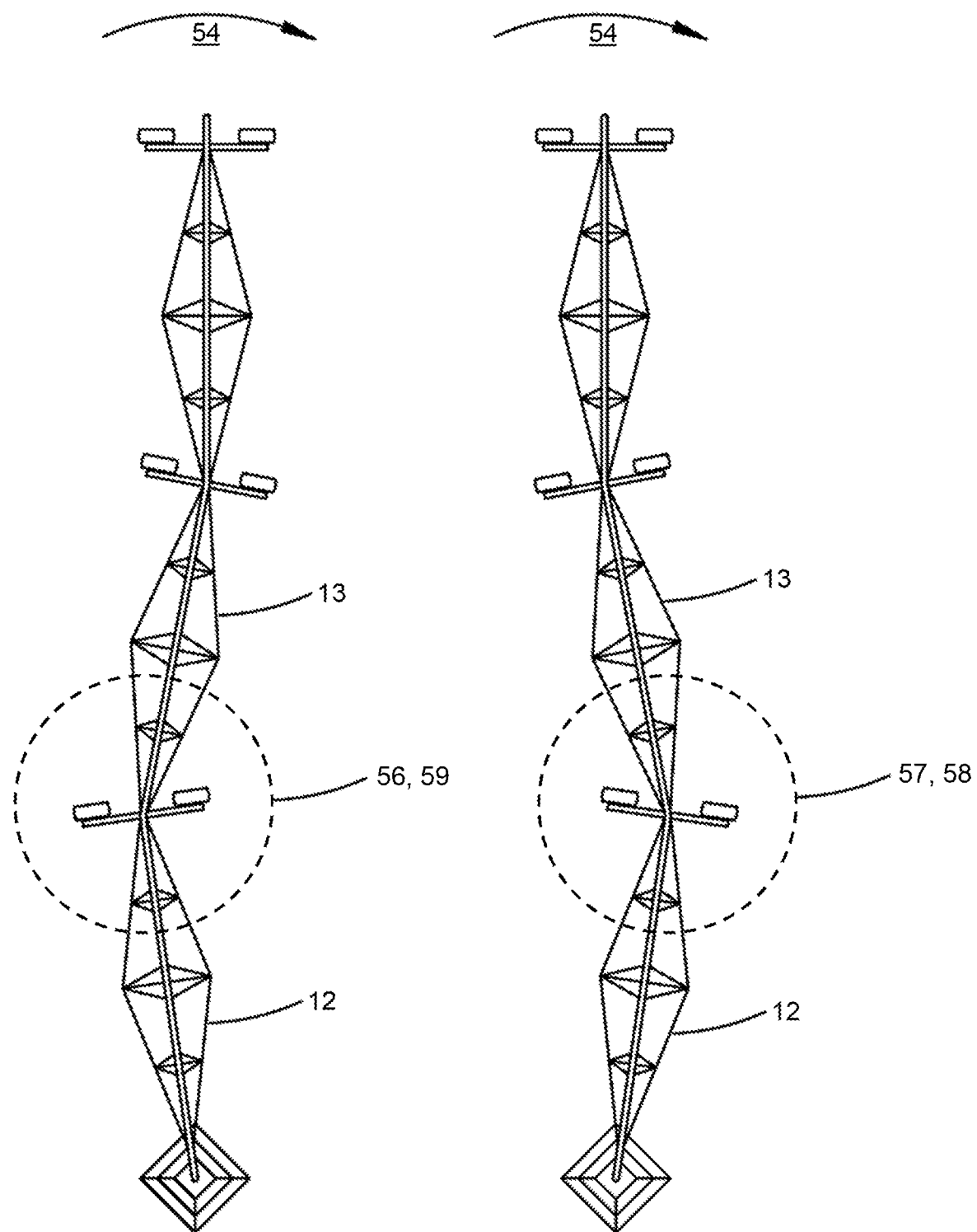
FIG. 4B is an illustration of the respective longitudinal axes of the spans of an irrigation system shown in FIGS. 1A and 1B in deviations in alignment in a forward movement direction in accordance with an example implementation of the prior art and with an example implementation of the present invention.
Figure 4C:
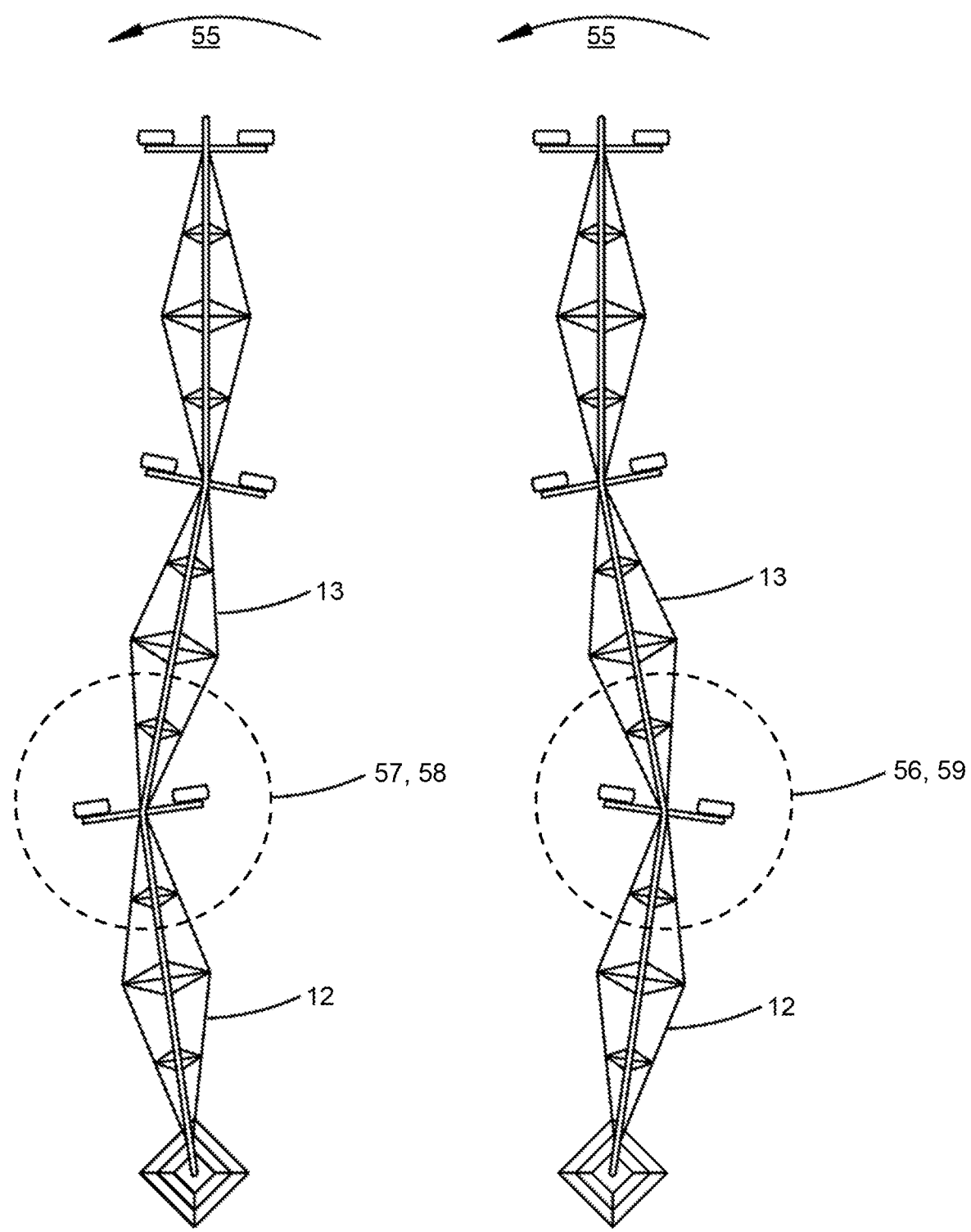
FIG. 4C is an illustration of the respective longitudinal axes of the spans of an irrigation system shown in FIGS. 1A and 1B in deviations in alignment in a reverse movement direction in accordance with an example implementation of the prior art and with an example implementation of the present invention.

FIGS. 4A, 4B, and 4C are illustrations of the respective longitudinal axes of the intermediate spans 12, 13 and end span 14 with deviations in alignment in either a forward movement direction 54 or a reverse movement direction 55 of an irrigation system 1 shown in FIG. 1A in accordance with an example implementation of the prior art.

Figure 5A:
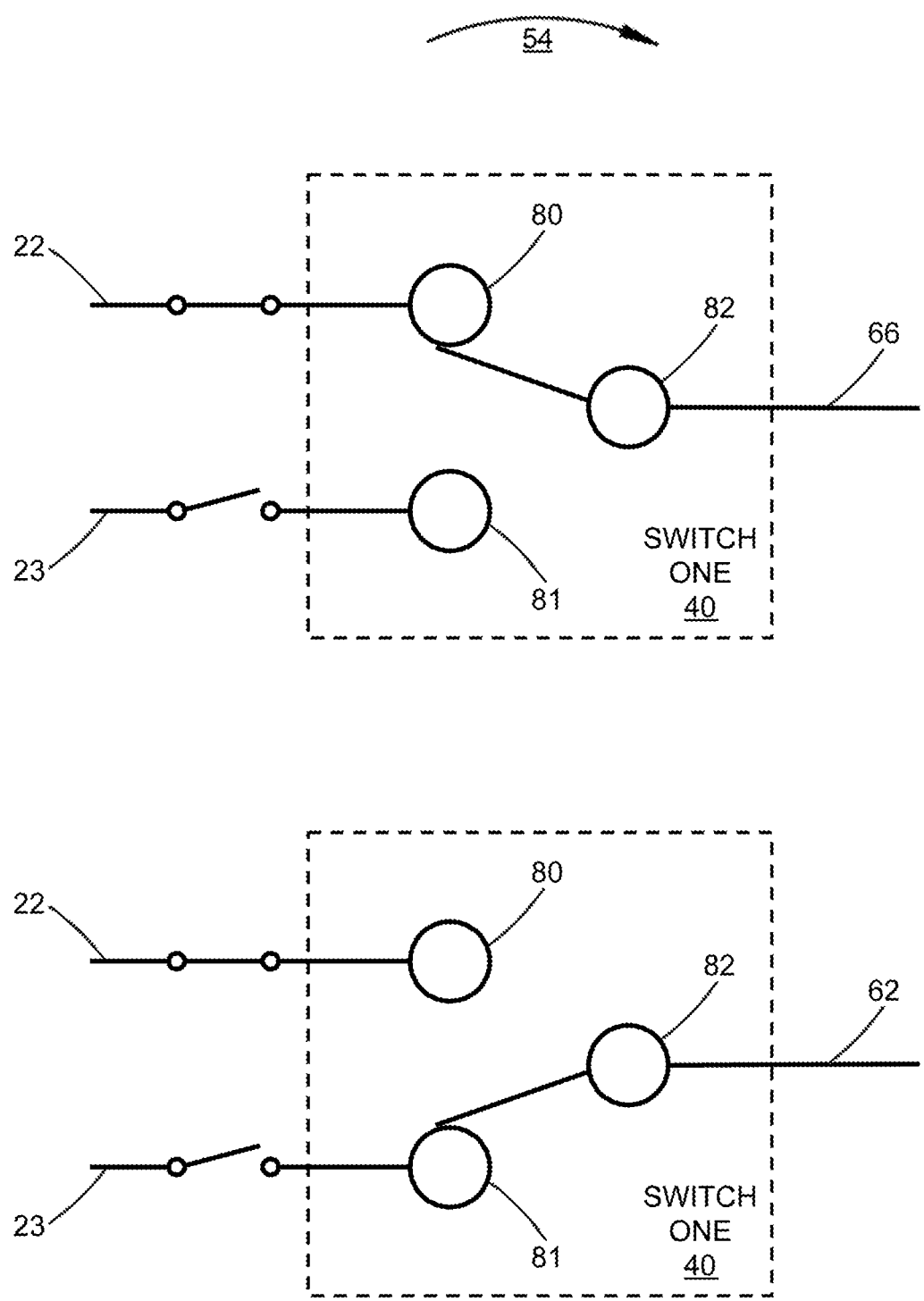
FIG. 5A is a schematic diagram illustrating the selected elements of switch one shown in FIGS. 2A and 2B in a forward movement direction in accordance with an example implementation of the prior art and with an example implementation of the present invention.

FIG. 5A is two schematic diagrams of switch one 40 of the irrigation system 1 shown in FIG. 1A in a forward movement direction 54 illustrating the double pole, single throw method of a switch one 40 configured in the upper diagram to indicate switch one 40 in an on signal switch one state 66 and in the lower diagram to indicate switch one 40 in an off signal switch one state 62 in accordance with an example implementation of the prior art.

Figure 5B:
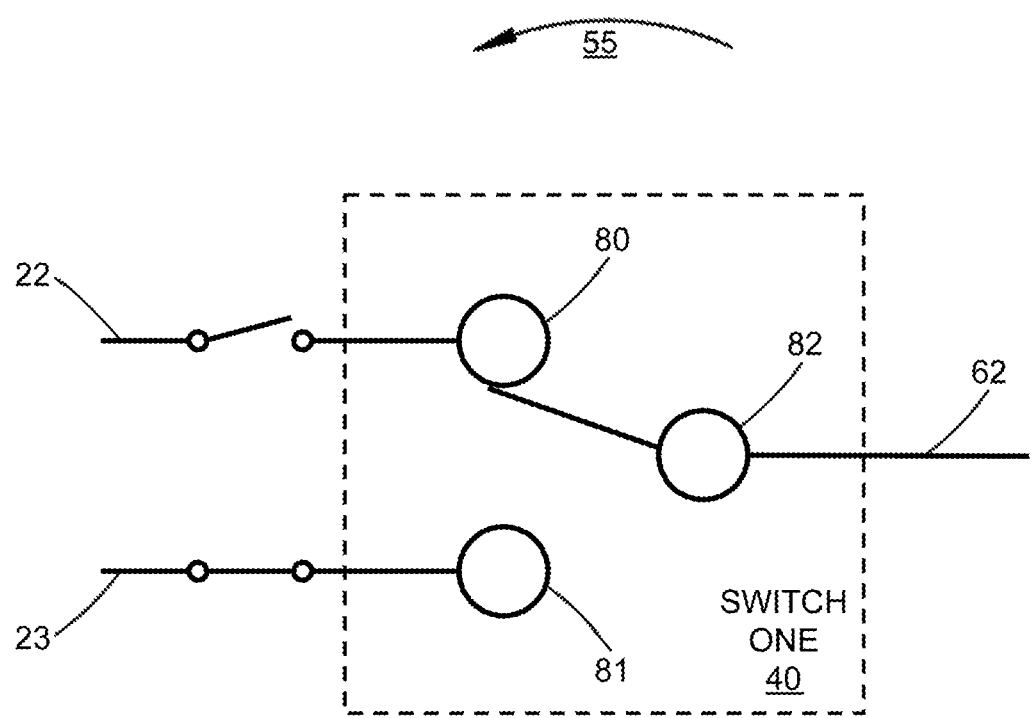
FIG. 5B is a schematic diagram illustrating the selected elements of the switch one shown in FIGS. 2A and 2B in a reverse movement direction in accordance with an example implementation of the prior art and with an example implementation of the present invention.
Figure 5B:
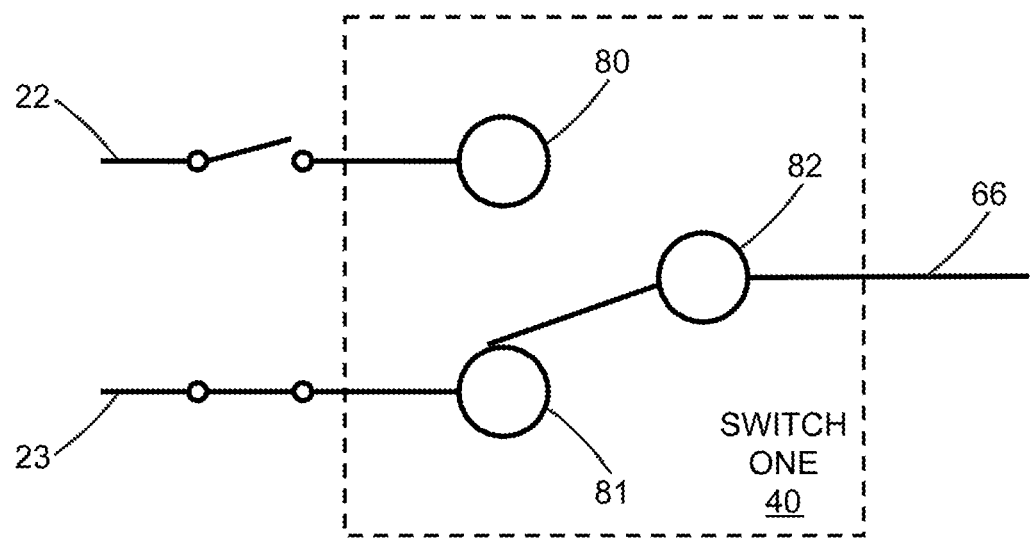

FIG. 5B is two schematic diagrams of switch one 40 of the irrigation system 1 shown in FIG. 1A in a reverse movement direction 55 illustrating the double pole, single throw method of switch one 40 configured in the upper diagram to indicate switch one 40 in an off signal switch one state 62 and in the lower diagram to indicate switch one 40 in an on signal switch one state 66 in accordance with an example implementation of the prior art.

Figure 6A:
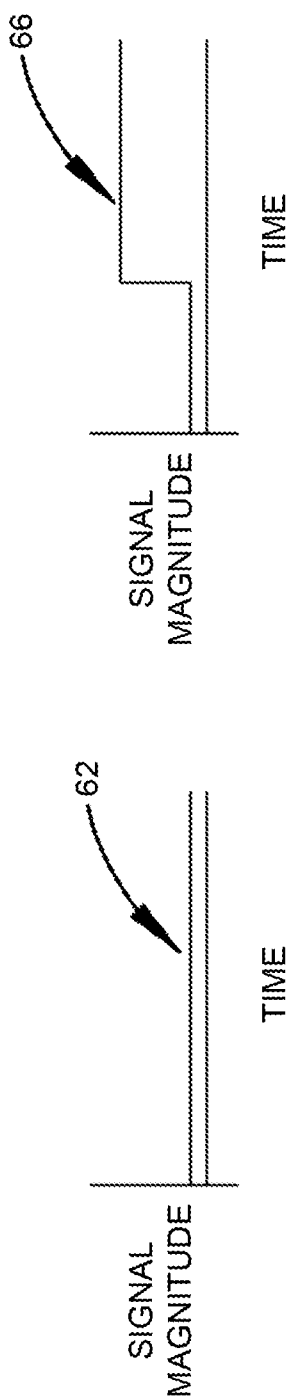
FIG. 6A is a graphical diagram illustrating the signal magnitudes of switch one of the irrigation system shown in FIGS. 1A and 1B in accordance with an example implementation of the prior art and with an example implementation of the present invention.

FIG. 6A is a graphical diagram illustrating the signal magnitudes of switch one 40 of the irrigation system 1 shown in FIG. 1A in accordance with an example implementation of the prior art.

Figure 8A:
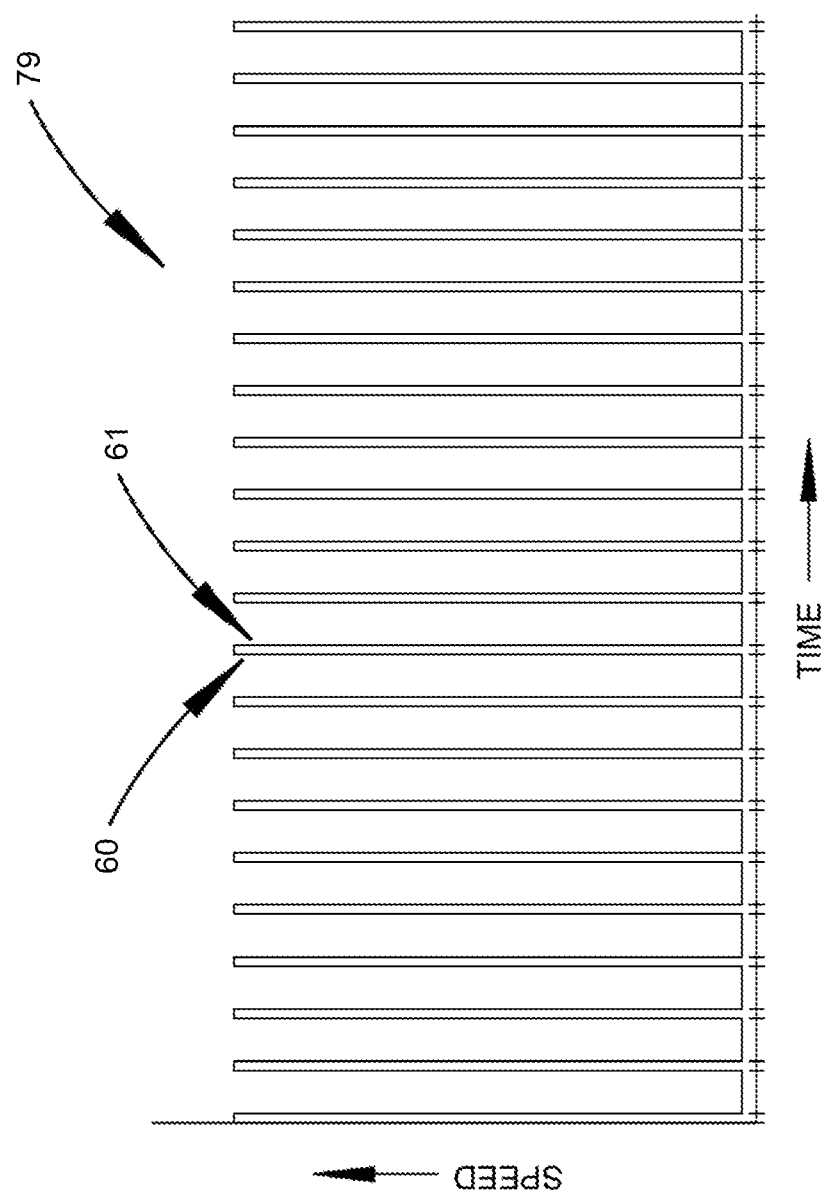
FIG. 8A is a graphical diagram illustrating transient state speeds of movement that result from the fixed-speed drive controller of the irrigation system shown in FIG. 1A in accordance with an example of the prior art repeatedly control cycling between span motor on and span motor off.

FIG. 8A is a graphical diagram illustrating transient state speeds of movement 79 that result from the fixed-speed drive controller 37 of the irrigation system 1 shown in FIG. 1A in accordance with an example of the prior art repeatedly control cycling between span motor on 60 and span motor off 61. The fixed-speed drive controller 37 controls the span motor on 60 based on an "on" signal switch status 66 and controls the span motor off 61 based on an "off" signal switch status 62.

Example Implementations of the Present Invention.

Figure 1B:
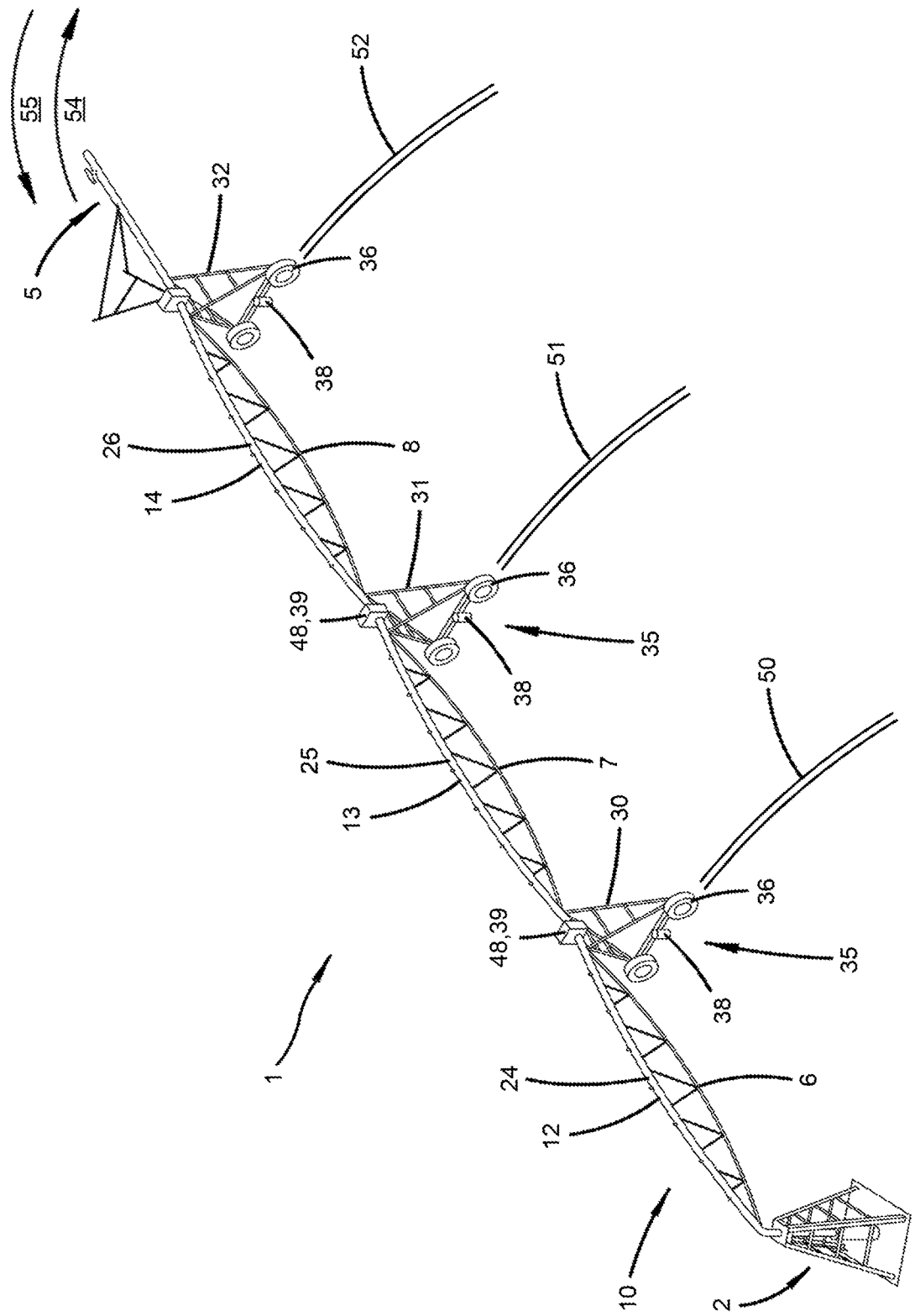
FIG. 1B is an isometric diagrammatic perspective view of an irrigation system in accordance with an example implementation of the present invention.

FIG. 1B illustrates a self-propelled (e.g., mechanized) irrigation system (assembly) 1 in accordance with example implementations of the present invention. Examples of self-propelled irrigation systems include a center pivot irrigation system, a linear move irrigation system, or the like. FIG. 1B illustrates an embodiment of the present invention wherein the irrigation system 1 is a center pivot irrigation system. However, it is contemplated that the present invention may be implemented in other self-propelled irrigation systems (e.g., linear move irrigation systems). As shown, the irrigation system 1 may include a center pivot point structure 2, a main section assembly 10 (irrigation section assembly) coupled (e.g., connected) to the center pivot point structure 2. The center pivot point structure 2 has access to a water source to furnish water to the irrigation system 1.

The main section assembly 10 includes a number of interconnected intermediate spans 12, 13 with applicant conduits 24, 25 that are each supported by a truss-type framework structure 6, 7 and by one or more intermediate tower structures 30, 31 and an interconnected end span 14 with applicant conduit 26 that is supported by a truss-type framework structure 8 and by an end tower structure 32. The intermediate tower structures 30, 31 and end tower structure 32 may be any tower configuration known in the art to adequately support the applicant conduits 24, 25, 26, (e.g., pipes) described herein. It is to be understood that the main section assembly 10 may include any number of spans 24, 25, 26 and intermediate tower structures 30, 31 and end tower structure 32. The direction of travel for the main section assembly 10 can be either a forward movement direction 54 or a reverse movement direction 55. The intermediate tower structures 30, 31 and the end tower structure 32 each may include one or more wheels 36, to assist in traversing the irrigation system 1 so as to pivot the main section assembly 10 about a ground surface, cultivation area or field in a forward movement direction 54 or a reverse movement direction 55 along wheel tracks 50, 51, 52. As shown in FIGS. 1A and 1B, each intermediate span 12, 13 and the end span 14 may include applicant conduits 24, 25, 26 (e.g., pipes) that are configured to carry liquid (e.g., applicant) along the length of the irrigation system 1 to one or more applicant dispersal assemblies that are configured to irrigate the cultivation area. Each conduit 24, 25, 26 may be coupled to one another to allow fluid communication between each conduit. In an implementation, the applicant conduits 24, 25, 26 may be supported by truss-type framework structures 6, 7, 8. Thus, the main fluid displacement device may be configured to displace applicant through the applicant conduits 24, 25, 26. As shown in FIGS. 1A and 1B, the irrigation system 1 also may include a cantilevered boom structure 5 that extends outwardly from the end tower structure 32.

Both the forward movement direction 54 and the reverse movement direction 55 are dependent on the direction of rotation of the central shafts of the rotors of the span motors 38. The wiring configuration of 3-phase supply power 67 conductor-L1 68, conductor-L2 69 and conductor-L3 70 (FIGS. 2A and 2B) included in incoming span cable 20 and outgoing span cable 21 may be configured to result in either a clockwise rotation or a counter clockwise rotation of the central shafts of the rotors of the span motors 38. Simply reconfiguring two of the three 3-phase supply power 67 conductor-L1 68, conductor-L2 69 and conductor-L3 70 results in a reversal of the rotation of the central shafts of the rotors of the span motors 38. Thus, in operation, the forward movement direction 54 or reverse movement direction 55 for irrigation system 1 is conventionally changed, both in the prior art and in the system of the present invention, from forward to reverse or reverse to forward using an electromechanical contactor device, typically located at a central control panel (not shown) and controlled by an operator, connected to span cable out 20 at a central control panel (not shown) at center pivot point structure 2 (FIGS. 1A and 1B). The operation of said electromechanical contactor device configures 3-phase supply power 67 conductor-L1 68, conductor-L2 69 and conductor-L3 70 (FIGS. 2A and 2B) in incoming span cable 20 so as to provide either a clockwise rotation or a counter clockwise rotation of the central shafts of the rotors of the span motors 38 that results in the desired forward movement direction 54 or reverse movement direction 55, as selected by an operator.

Figure 2B:
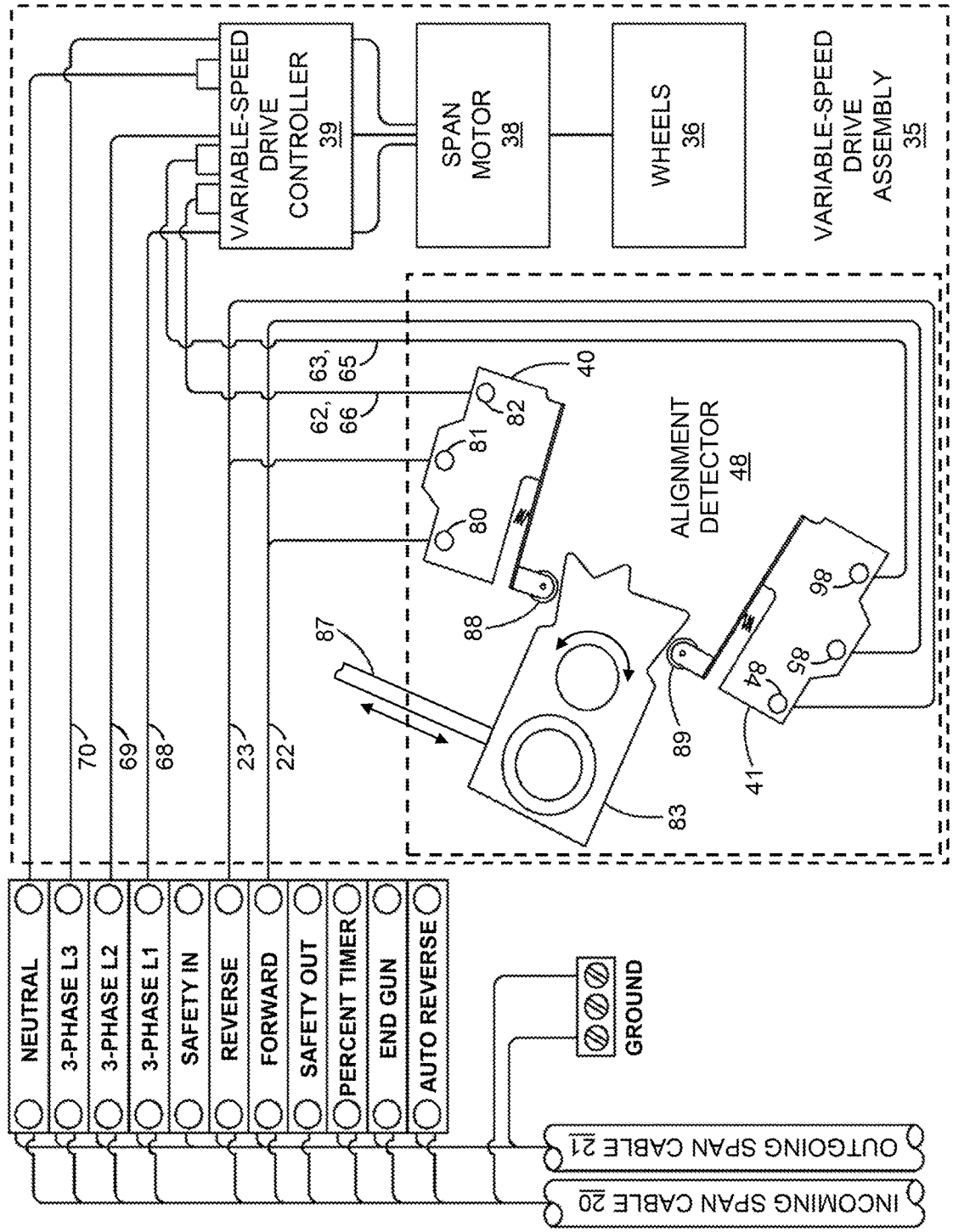
FIG. 2B is a schematic diagram illustrating the selected elements of the variable-speed drive assembly of the irrigation system shown in FIG. 1B in accordance with an example implementation of the present invention.

With reference to FIGS. 2A and 2B, it should also be noted that typically the same electromechanical contactor device, typically located at a central control panel (not shown) and controlled by an operator, that configures 3-phase supply power 67 conductor-L1 68, conductor-L2 69 and conductor-L3 70 to set the rotation of the central shafts of the rotors of span motors 38 to result in either a forward movement direction 54 or a reverse movement direction 55 also provides the respective forward direction signal 22 or reverse direction signal 23.

With reference to FIG. 2B, each variable-speed drive assembly 35 may include an alignment detector 48 (including a switch one 40 with a roller-actuating arm one 88, a normally closed switch one contact 80, a normally opened switch one contact 81, and a common switch one contact 82, and including a switch two 41 with a roller-actuating arm two 89, a normally closed switch two contact 84, a normally opened switch two contact 85, and a common switch two contact 86, a cam 83, and a rod 87), a span motor 38, wheels 36, and a variable-speed drive controller 39 that varies aspects of the supply power 67 (i.e., varies the speed) furnished to the corresponding span motor 38. The forward direction signal 22 and reverse direction signal 23 are communicated to the variable-speed drive assembly 35 by way of incoming span cable 20 and outgoing span cable 21. The forward direction signal 22 and reverse direction signal 23 are each discretely connected by wire or other means to switch one 40 and, in an opposite manner, to switch two 41 of alignment detector 48 in the variable-speed drive assembly 35. Furthermore and with reference to the alignment detector 48 shown in FIG. 2B, the rotation of cam 83, rotated by one or more rods 87, may actuate roller-actuating arm one 88 of switch one 40 in an opposite manner as compared to roller-actuating arm two 89 of switch two 41.

With reference to FIGS. 2B, 5A and 5B, the forward direction signal 22 circuit is conventionally connected to a normally closed switch one contact 80 in switch one 40 and the reverse direction signal 23 circuit is conventionally connected to a normally opened switch one contact 81 in switch one 40 (although in an embodiment this configuration could be different). The actuation of roller-actuating arm one 88 of switch one 40 by the rotation of one or more cams 83, rotated by one or more rods 87, connects the common switch one contact 82 of switch one 40 alternatively either to the normally closed switch one contact 80 (e.g., to the forward direction signal 22), or to the normally opened switch one contact 81 (e.g., to the reverse direction signal 23). The forward direction signal 22 and reverse direction signal 23 as determined by the forward movement direction 54 and reverse movement direction 55 is thereby either closed to the common switch one contact 82 of switch one 40 or opened to the common switch one contact 82 of switch one 40, as determined by the position of roller-actuating arm one 88 against cam 83. Thereby, common switch one contact 82 signals either an "off" signal switch one state 62 or an "on" signal switch one state 66 to variable-speed drive controller 39 based, first, on either a forward direction signal 22 or a reverse direction signal 23 and, second, on the connection of common switch one contact 82 to either the normally closed switch one contact 80 or the normally opened switch one contact 81. The common switch one contact 82 is (i.e., signals an "on" signal switch one state 66) when either a forward direction signal 22 or reverse direction signal 23 is enabled to pass through switch one 40 based on the position of roller-actuating arm one 88 against cam 83, rotated by one or more corresponding rods 87. The common switch one contact 82 is de-energized (i.e., signals an "off" signal switch one state 62) when neither a forward direction signal 22 nor reverse direction signal 23 is enabled to pass through switch one 40 based on the position of the corresponding cam 83, rotated by one or more corresponding rods 87. In operation, alignment detector 48 outputs either an "on" signal switch one state 66 or an "off" signal switch one state 62, such output of alignment detector 48 being monitored and processed by the variable-speed drive controller 39 as shown in FIGS. 2B, 5A, 5B, 9A and 9C.

Figure 5C:
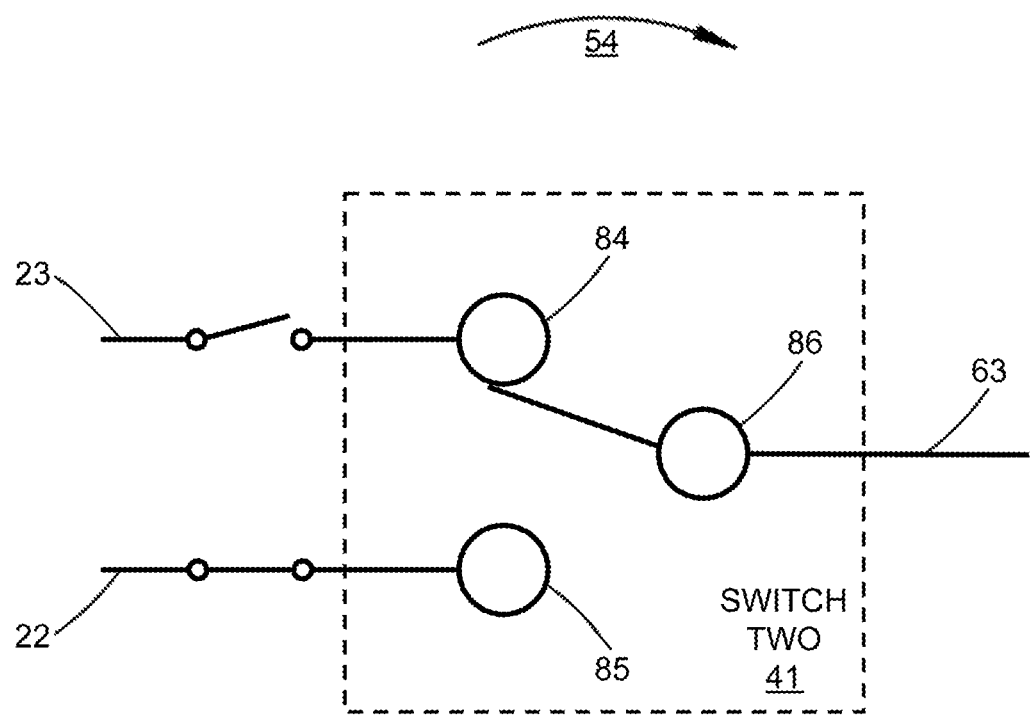
FIG. 5C is a schematic diagram illustrating the selected elements of switch two shown in FIG. 2B in a forward movement direction in accordance with an example implementation of the present invention.
Figure 5C:
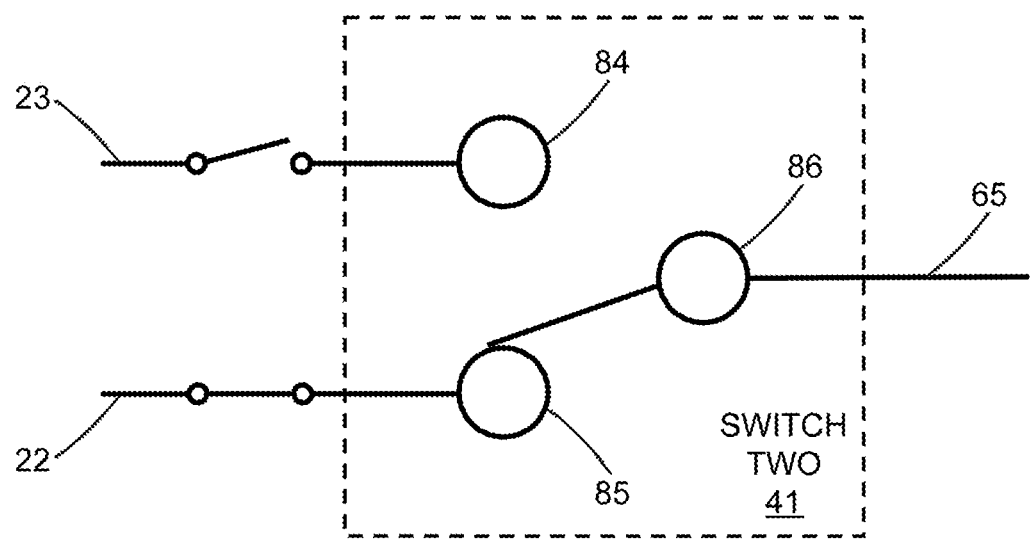
Figure 5D:
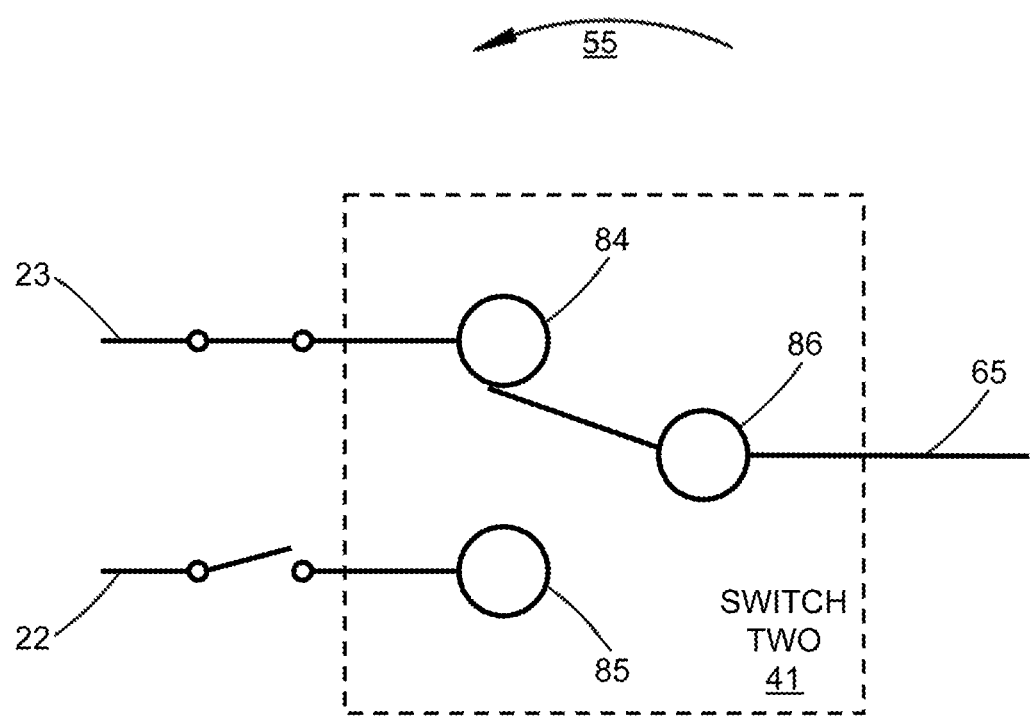
FIG. 5D is a schematic diagram illustrating the selected elements of switch two shown in FIG. 2B in a reverse movement direction in accordance with an example implementation of the present invention.
Figure 5D:
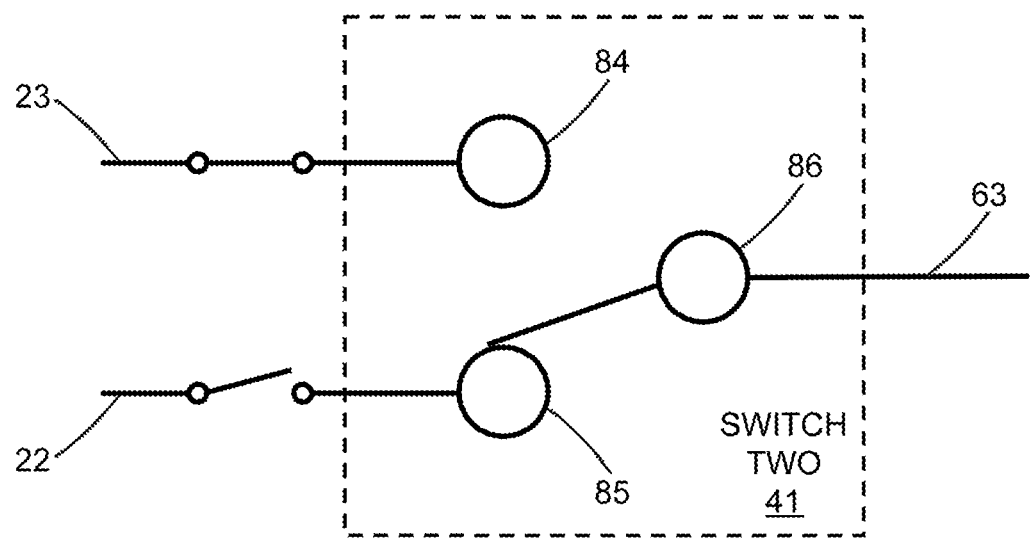

Additionally and with reference to FIGS. 2B, 5C and 5D, the forward direction signal 22 circuit is connected to a normally opened switch two contact 85 in switch two 41 and the reverse direction signal 23 circuit is connected to a normally closed switch two contact 84 in switch two 41 (although in an embodiment this configuration could be different). The actuation of roller-actuating arm two 89 of switch two 41 by the rotation of one or more cams 83, rotated by one or more rods 87, connects the common switch two contact 86 of switch two 41 alternatively either to the normally closed switch two contact 84 (e.g., to the reverse direction signal 23), or to the normally opened switch two contact 85 (e.g., to the forward direction signal 22). The forward direction signal 22 and reverse direction signal 23 as determined by the forward movement direction 54 and reverse movement direction 55 are thereby either closed to the common switch two contact 86 of switch two 41 or opened to the common switch two contact 86 of switch two 41, as determined by the position of cam 83, rotated by one or more rods 87, and resulting actuation of roller-actuating arm two 89 of switch two 41. Thereby, common switch two contact 86 signals either an "off" signal switch two state 63 or an "on" signal switch two state 65 to variable-speed drive controller 39 based, first, on either a forward direction signal 22 or a reverse direction signal 23 and, second, on the connection of common switch two contact 86 to either the normally closed switch two contact 84 or the normally opened switch two contact 85. The common switch two contact 86 is energized (i.e., signals an "on" signal switch two state 65) when either a forward direction signal 22 or reverse direction signal 23 is enabled to pass through switch two 41 based on the position of roller-actuating arm two 89 against cam 83, rotated by one or more corresponding rods 87. The common switch two contact 86 is de-energized (i.e., signals an "off" signal switch two state 63) when neither a forward direction signal 22 nor reverse direction signal 23 is enabled to pass through switch two 41 based on the position of the corresponding cam 83, rotated by one or more corresponding rods 87. In operation, alignment detector 48 outputs either an "on" signal switch two state 65 or an "off" signal switch two state 63, such output of alignment detector 48 being monitored and processed by the variable-speed drive controller 39 as shown in FIGS. 2B, 5C, 5B, 9B and 9D.

Simultaneously and in combination, alignment detector 48 outputs to the processor 42 (shown in FIG. 3C) of variable-speed drive controller 39 either an "on" signal switch one state 66 or an "off" signal switch one state 62 (FIGS. 2B, 5A, 5B, 9A and 9C) and either an "on" signal switch two state 65 or an "off" signal switch two state 63 (FIGS. 2B, 5C, 5D, 9B and 9D).

Furthermore, in a preferred embodiment, the processor 42 of variable-speed drive controller 39 (shown in FIGS. 10A and 10B) processes the following two signal switch one states 62, 66 and signal switch two states 63, 65 combinations:

| signal switch one | signal switch two |
|---|---|
| 66 + | 65 (not shown in FIG. 2B) |
| 62 + | 63 (not shown in FIG. 2B) |
| 66 + | 63 (as shown in FIG. 2B) |
| 62 + | 65 (not shown in FIG. 2B) |

Figure 10A:
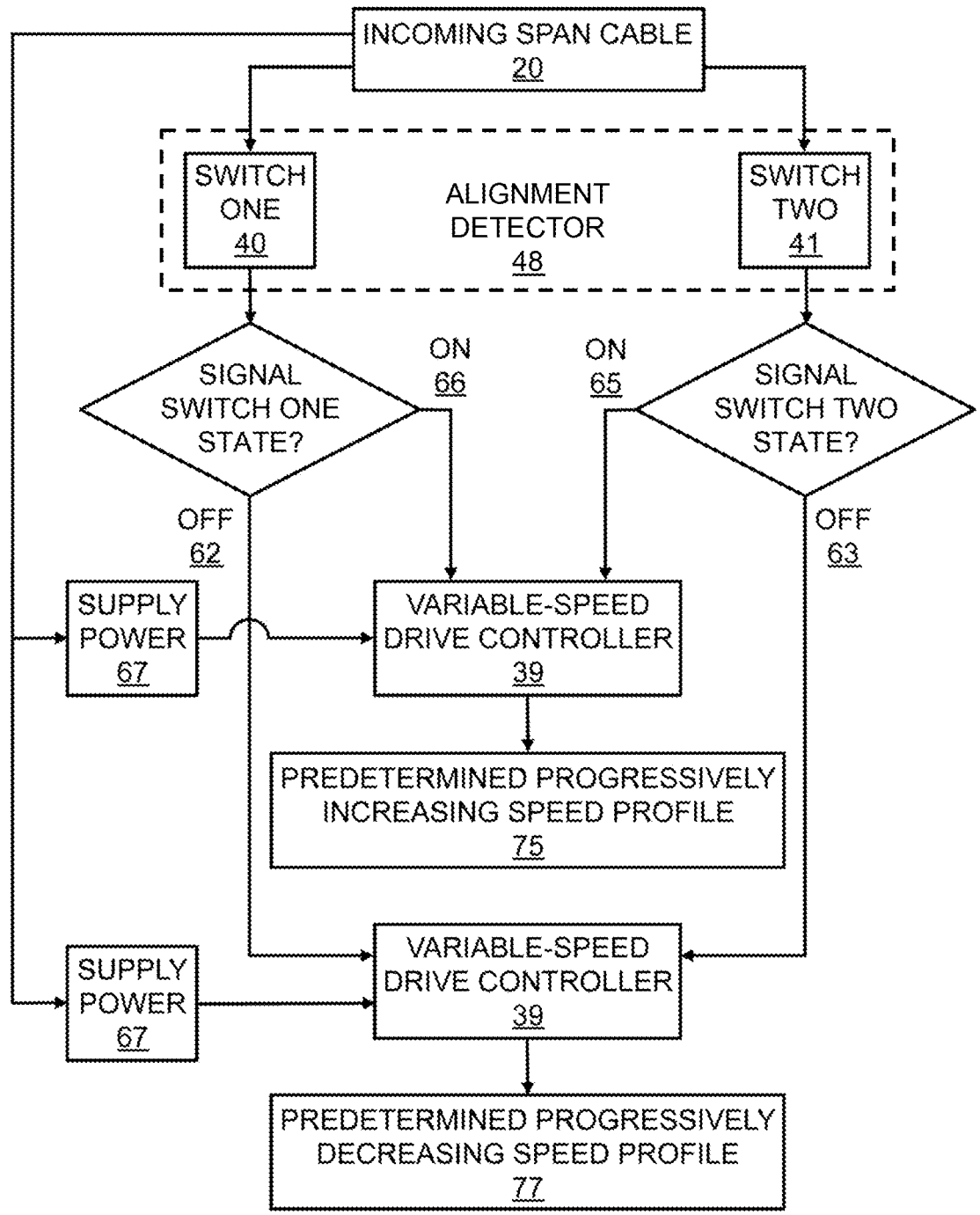
FIG. 10A is a block diagram illustrating the first of two switch one and switch two configurations and the first configuration of sixteen total configurations of the present invention of the irrigation system shown in FIG. 1B in accordance with an example implementation of the present invention.
Figure 10B:
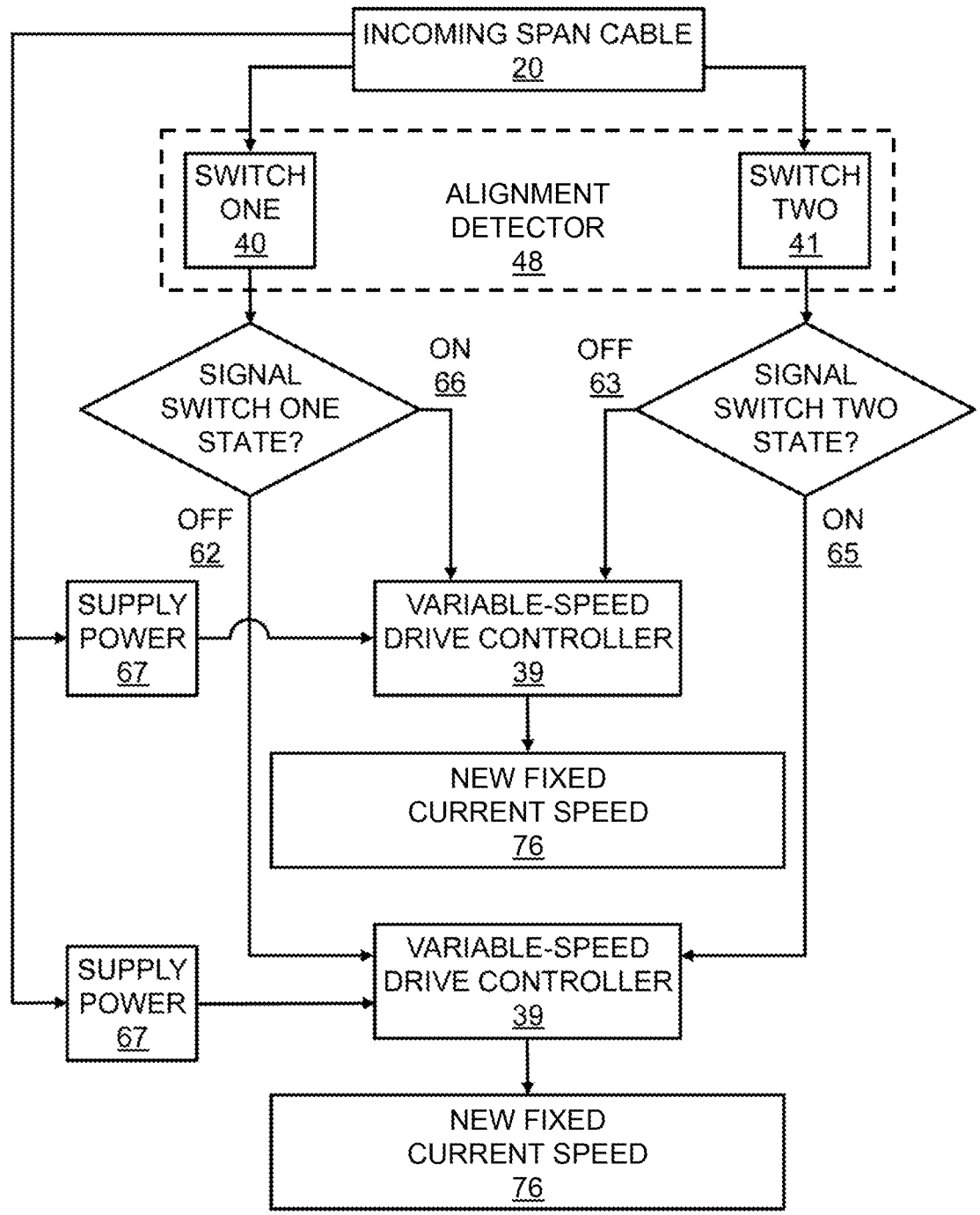
FIG. 10B is a block diagram illustrating the second of two switch one and switch two configurations and the first configuration of sixteen total configurations of the present invention of the irrigation system shown in FIG. 1B in accordance with an example implementation of the present invention.

The processor 42 of variable-speed drive controller 39 may be configured to process each pair of the above two signal switch one states 62, 66 and signal switch two states 63, 65 combinations and, in turn, select from memory 44 and continuously furnish to the corresponding span motor 38, via communications module 46, a predetermined progressively increasing speed profile 75, a predetermined progressively decreasing speed profile 77, or a new fixed current speed 76. The resulting combinations of the present invention are as follows:

| signal switch one | signal switch two | selects from memory and continuously furnishes |
|---|---|---|
| 66 + | 65 = | 75 (as shown in FIG. 10A) |
| 62 + | 63 = | 77 (as shown in FIG. 10A) |
| 66 + | 63 = | 76 (as shown in FIG. 10B) |
| 62 + | 65 = | 76 (as shown in FIG. 10B) |

FIGS. 10A and 10B illustrate the above two signal switch one states 62, 66 and signal switch two states 63, 65 combinations, wherein switch one 40 has either an "on" signal switch one state 66 or an "off" signal switch one state 62 and switch two 41 has either an "on" signal switch two state 65 or an "off" signal switch two state 63. FIGS. 10A and 10B further illustrate a predetermined progressively increasing speed profile 75, a predetermined progressively decreasing speed profile 77, and a new fixed current speed 76 of variable-speed drive controller 39, each predetermined progressively increasing speed profile 75, predetermined progressively decreasing speed profile 77 and new fixed current speed 76 based on the processing of signal switch one states 62, 66 and signal switch two states 63, 65, respectively, by the processor 42 of the variable-speed drive controller 39.

Figure 10C:
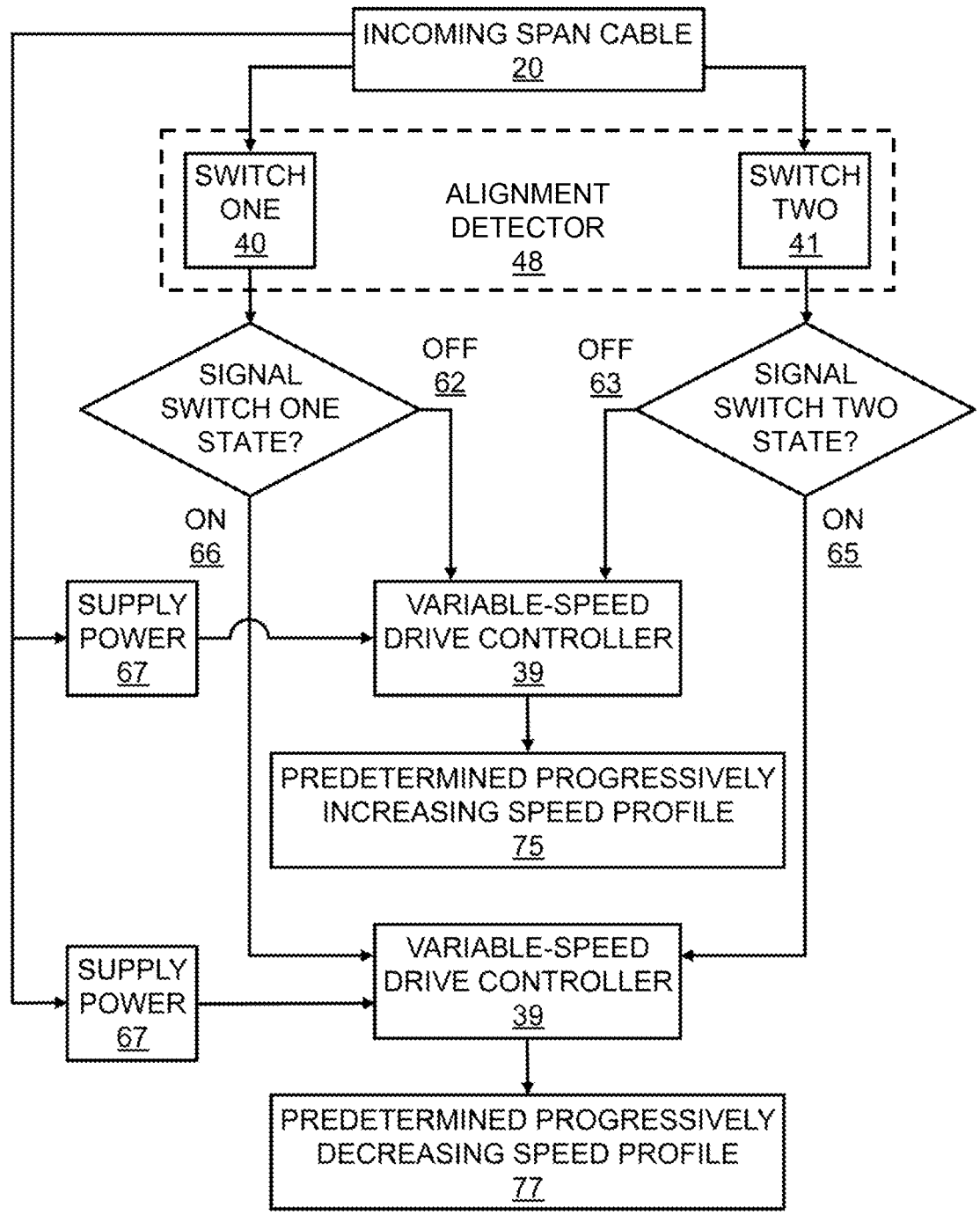
FIG. 10C is a block diagram illustrating the first of two switch one and switch two configurations and the second configuration of sixteen total configurations of the present invention of the irrigation system shown in FIG. 1B in accordance with an example implementation of the present invention.
Figure 10D:
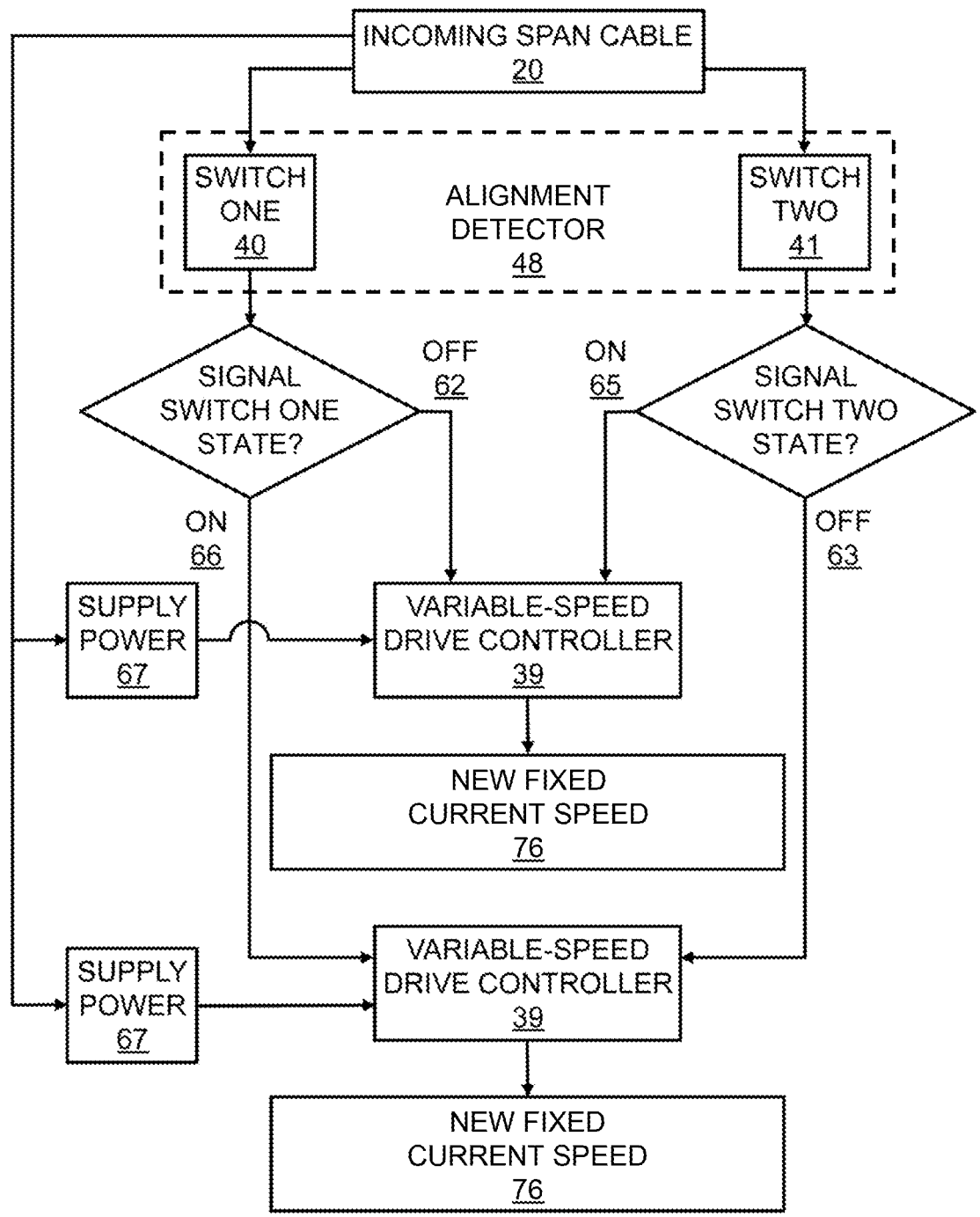
FIG. 10D is a block diagram illustrating the second of two switch one and switch two configurations and the second configuration of sixteen total configurations of the present invention of the irrigation system shown in FIG. 1B in accordance with an example implementation of the present invention.

It is to be understood by those familiar with the art that in separate embodiments the wiring configuration of both switch one 40 and switch two 41 that provide the outcomes as shown in FIGS. 10A and 10B could be configured to provide multiple differing outcomes. FIGS. 10C and 10D illustrate an example of differing outcomes in-lieu-of the outcomes as shown in FIGS. 10A and 10B without altering the disclosure.

Figure 8B:
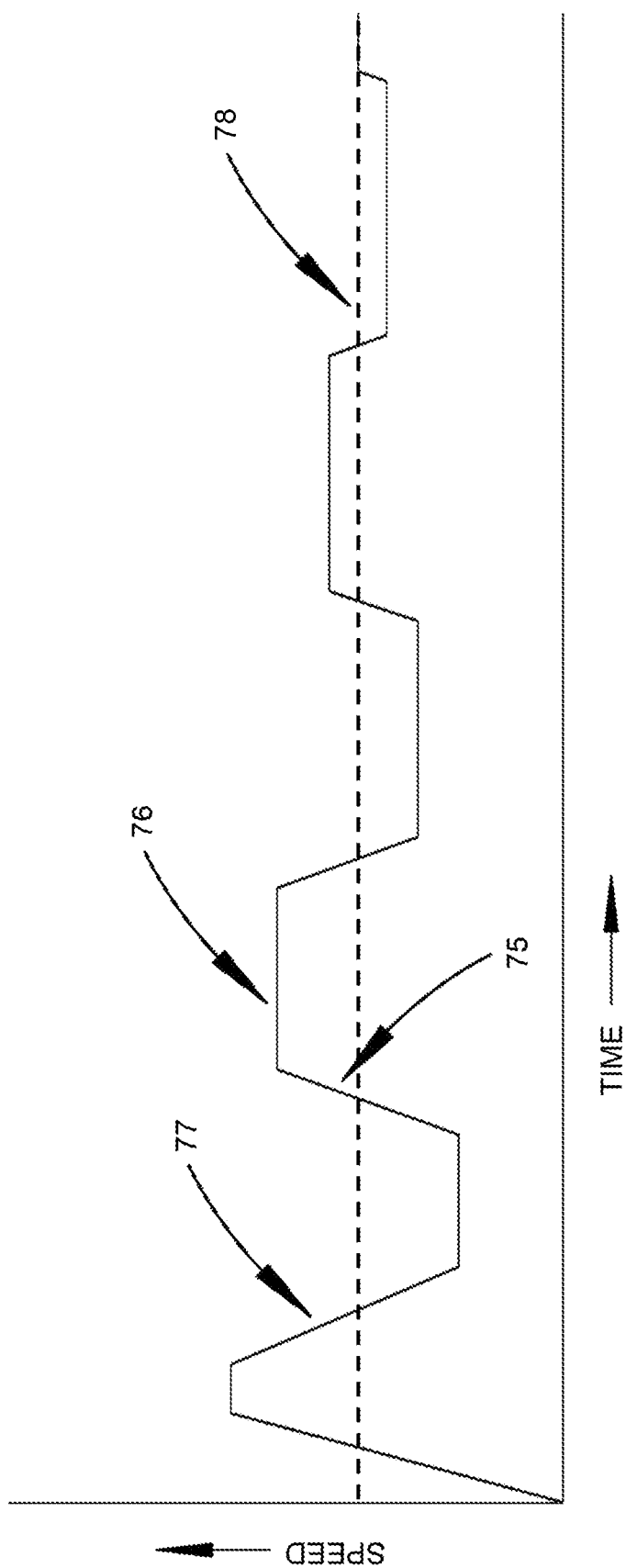
FIG. 8B is a graphical diagram illustrating steady state speeds of movement that evolve from alternating predetermined progressively increasing speed profiles, predetermined progressively decreasing speed profiles, and new fixed current speeds of the variable-speed drive controller selected from memory and continuously furnished to the corresponding span motors of the irrigation system shown in FIG. 1B in accordance with an example implementation of the present invention.
Figure 9A:
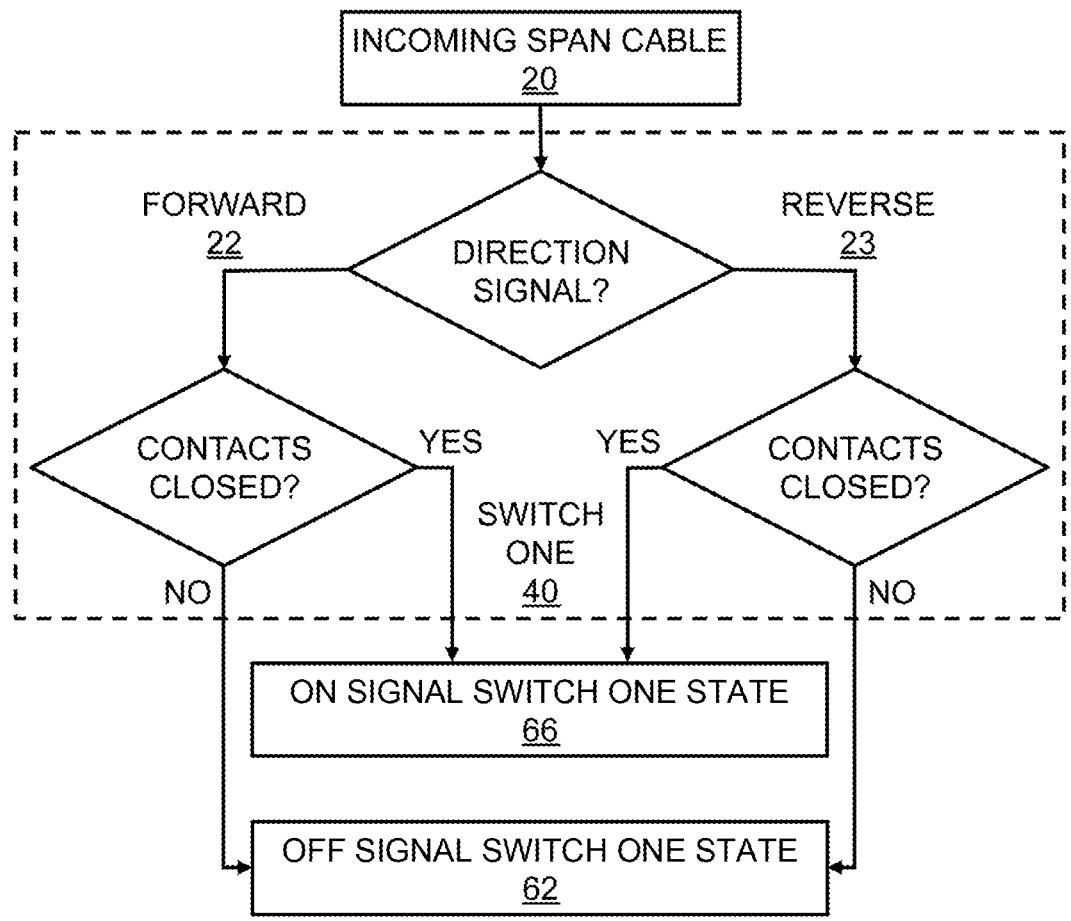
FIG. 9A is a block diagram illustrating the first of two switch one configurations of the present invention of the irrigation system shown in FIG. 1B in accordance with an example implementation of the present invention.
Figure 9B:
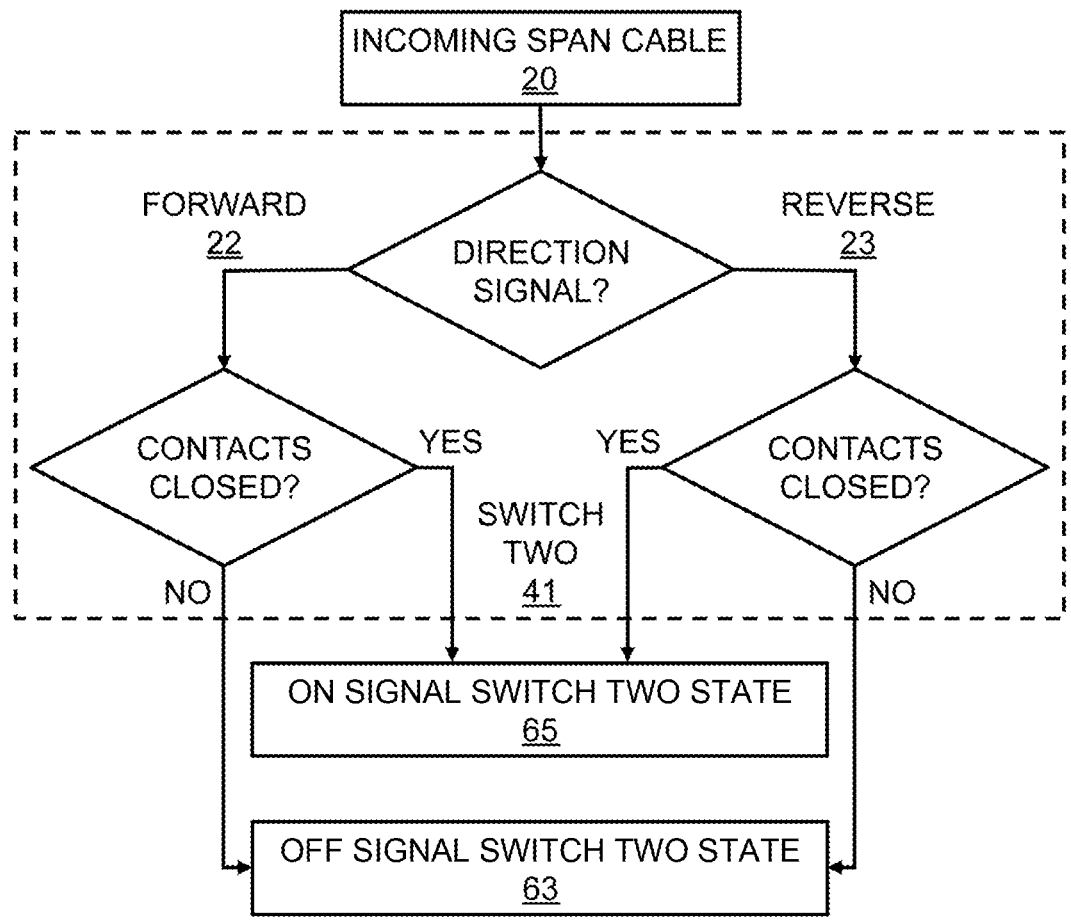
FIG. 9B is a block diagram illustrating the first of two switch two configurations of the present invention of the irrigation system shown in FIG. 1B in accordance with an example implementation of the present invention.
Figure 9C:
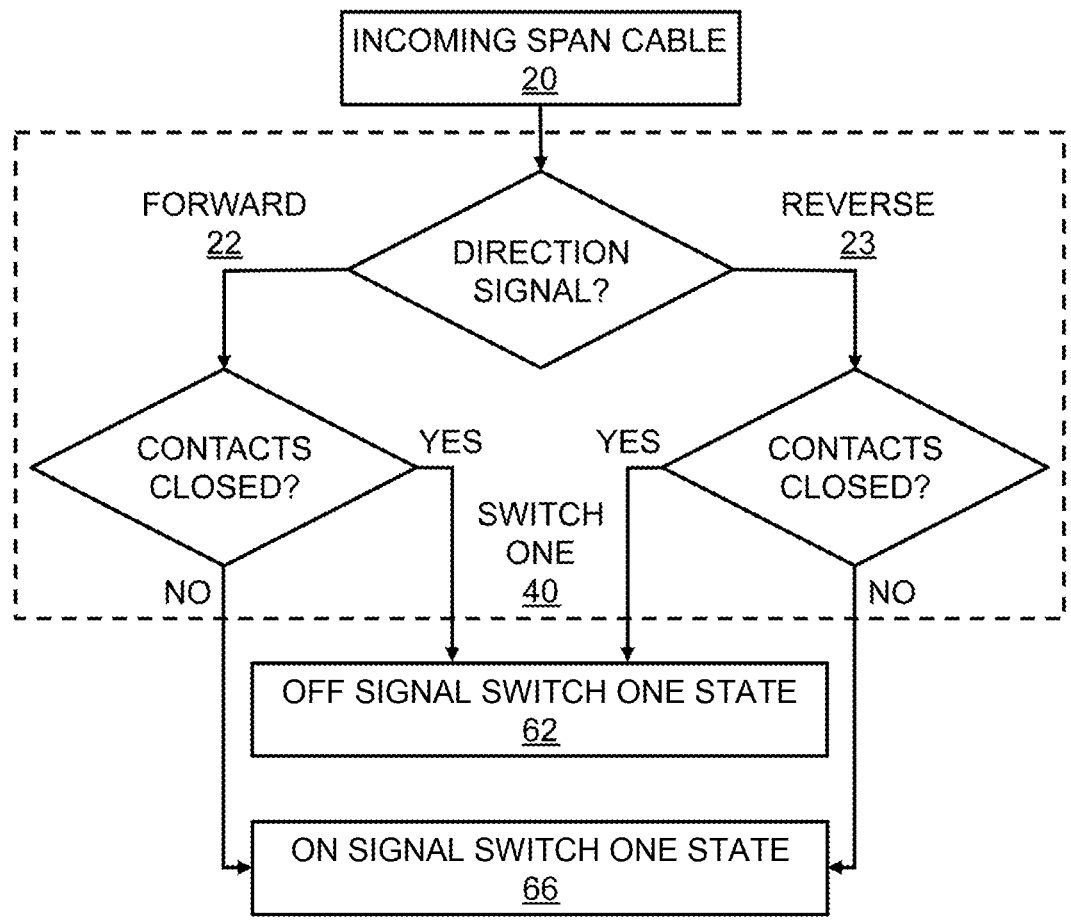
FIG. 9C is a block diagram illustrating the second of two switch one configurations of the present invention of the irrigation system shown in FIG. 1B in accordance with an example implementation of the present invention.
Figure 9D:
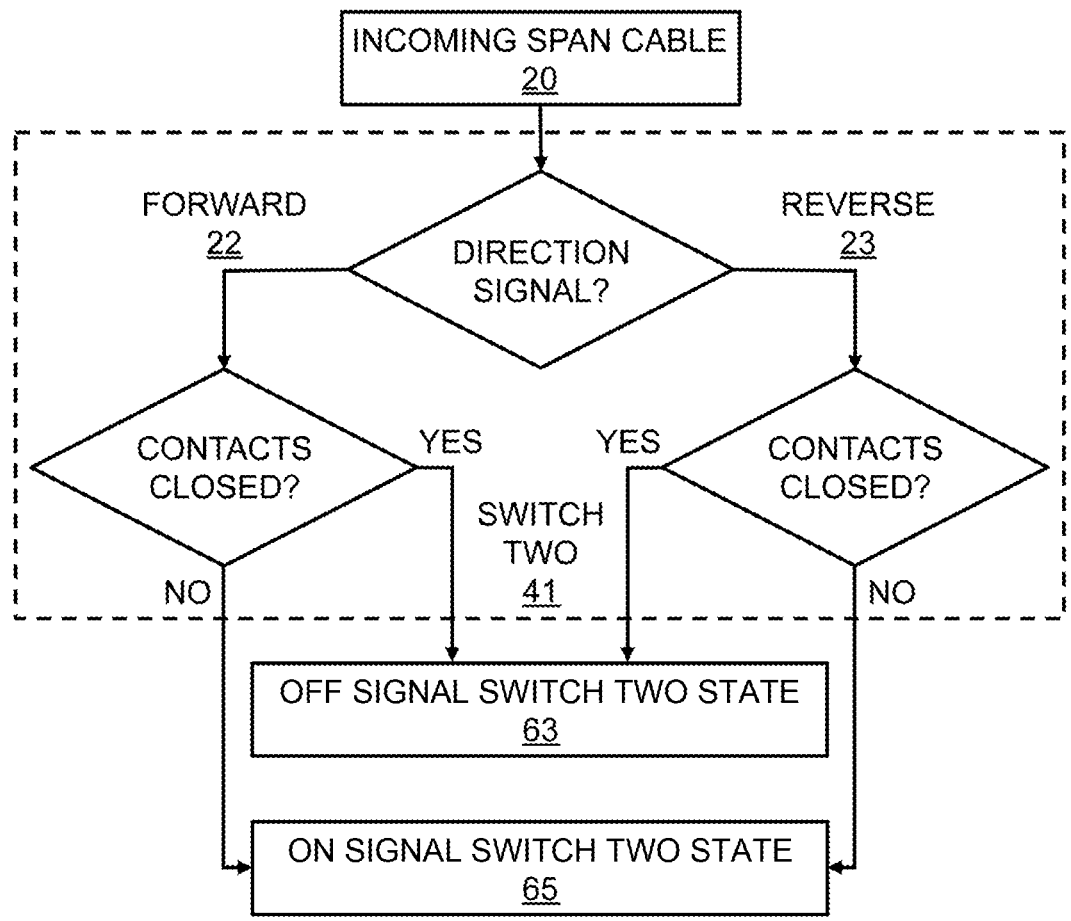
FIG. 9D is a block diagram illustrating the second of two switch two configurations of the present invention of the irrigation system shown in FIG. 1B in accordance with an example implementation of the present invention.

With reference to FIG. 8B, the above system of the present invention discussed herein provides a significant and unique improvement in operation of irrigation systems 1 as compared to the prior art, including the prior art pertaining to all other continuous movement control systems. This significant and unique improvement is the evolving of steady state speeds of movement 78 (as shown in FIG. 8B) rather than constantly transitioning or transient state speeds of movement 79 (as shown in FIG. 8A) that result from span motor on 60 to span motor off 61 and from span motor off 61 to span motor on 60, as required by conventional repetitive start-and-stop movement control systems of the prior art, as well as slower to faster speeds and faster to slower speeds, as required by all other continuous movement control systems. Furthermore, in the system of the present invention, the new fixed current speeds 76 eventually evolve to steady state speeds of movement 78 of the variable-speed drive assemblies 35 of each respective intermediate tower structure 30, 31 as the corresponding variable-speed drive controller 39 selects from memory 44 and continuously furnishes to the corresponding span motor 38 a predetermined progressively increasing speed profile 75 followed by a new fixed current speed 76 and a predetermined progressively decreasing speed profile 77 followed by a new fixed current speed 76 shown in FIG. 8B. Such new fixed current speeds 76 eventually evolve to distinct steady state speeds of movement 78 of the variable-speed drive assemblies of each respective intermediate tower structure 30, 31 that achieve and maintain alignment among a plurality of respective intermediate spans 12, 13 without the need for constantly transitioning speeds or transient state speeds of movement 79 as with the repetitive start-and-stop movement control systems of the prior art as well all other continuous movement control systems.

In an example of an implementation;

1. Assume the variable-speed drive assembly 35, of the intermediate tower structure 30 of an irrigation system 1 (FIG. 1B) having a forward movement direction 54, requires a 1.0 feet per minute speed of movement of the variable-speed drive assembly 35 in order to maintain intermediate span 12 in both a non-lagging state of alignment 57 and a non-leading state of alignment 59 with intermediate span 13 (as shown in FIG. 4A) with steady state speeds of movement 78 (as shown in FIG. 8B).

2. In both a non-lagging state of alignment 57 and a non-leading state of alignment 59 with intermediate span 13 (as shown in FIG. 4A), a variable-speed drive controller 39 of the variable-speed drive assembly 35 is monitoring and processing a corresponding alignment detector 48 with a switch one 40 with an "on" signal switch one state 66 (as shown in FIG. 2B and as shown in upper illustration of FIG. 5A) and a switch two 41 with an "off" signal switch two state 63 (as shown FIG. 2B and as shown in upper illustration of FIG. 5C)

3. Based on the "on" signal switch one state 66 and "off" signal switch two state 63 output of alignment detector 48, the variable-speed drive controller 39 selects from memory 44 and continuously furnishes to the corresponding span motor 38 a new fixed current speed 76 (as shown in FIG. 10B) that results, in this example, in a 1.2 feet per minute speed of movement of the variable-speed drive assembly 35.

4. Subsequently, the new fixed current speed 76 (as shown in FIG. 10B) that results, in this example, in a 1.2 feet per minute speed of movement of the variable-speed drive assembly 35, eventually results in a leading state of alignment 58 (as shown in right illustration of FIG. 4B) that immediately results in switch one 40 changing from an "on" signal switch one state 66 to an "off" signal switch one state 62 (as shown in FIG. 5A), while switch two 41 remains in an "off" signal switch two state 63 (as shown in upper illustration of FIG. 5C).

5. Based on the "off" signal switch one state 62 and "on" signal switch two state 65 output of the corresponding alignment detector 48, the variable-speed drive controller 39 selects from memory 44 and continuously furnishes to the corresponding span motor 38 a predetermined progressively decreasing speed profile 77 (as shown in FIG. 10A).

6. Subsequently, the predetermined progressively decreasing speed profile 77 (as shown in FIG. 10A) that results in a decreasing speed of movement of the variable-speed drive assembly 35, eventually results in both a non-lagging state of alignment 57 and a non-leading state of alignment 59 with intermediate span 13 (as shown in FIG. 4A) that immediately results in a switch one 40 changing from an "off" signal switch one state 62 to an "on" signal switch one state 66 (as shown in 5A), while switch two 41 remains in an "off" signal switch two state 63 (as shown in upper illustration of FIG. 5C). Such changing from an "off" signal switch one state 62 to an "on" signal switch one state 66 (as shown in 5A) occurring at the exact moment the variable-speed drive assembly 35 is moving at 0.9 feet per minute.

7. Based on the "on" signal switch one state 66 and "off" signal switch two state 63 output of the corresponding alignment detector 48, the variable-speed drive controller 39 selects from memory 44 and continuously furnishes to the corresponding span motor 38 a new fixed current speed 76 (as shown in FIG. 10B) that results in a 0.9 feet per minute speed of movement of the variable-speed drive assembly 35.

8. Subsequently, the new fixed current speed 76 (as shown in FIG. 10B) that results in a 0.9 feet per minute speed of movement of the variable-speed drive assembly 35, eventually results in a lagging state of alignment 56 (as shown in left illustration of FIG. 4B) that immediately results in switch two 41 changing from an "off" signal switch two state 63 to an "on" signal switch two state 65 (as shown in FIG. 5C), while switch one 40 remains in an "on" signal switch one state 66 (as shown in upper illustration of FIG. 5A).

9. Based on the "on" signal switch two state 65 and "on" signal switch one state 66 output of the corresponding alignment detector 48, the variable-speed drive controller 39 selects from memory 44 and continuously furnishes to the corresponding span motor 38 a predetermined progressively increasing speed profile 75 (as shown in FIG. 10A).

10. Subsequently, the predetermined progressively increasing speed profile 75 (as shown in FIG. 10A) that results in an increasing speed of movement of the variable-speed drive assembly 35, eventually results in both a non-lagging state of alignment 57 and a non-leading state of alignment 59 with intermediate span 13 (as shown in FIG. 4A) that immediately results in a switch two 41 changing from an "on" signal switch two state 65 to an "off" signal switch two state 63 (as shown in 5C), while switch one 40 remains in an "on" signal switch one state 66 (as shown in upper illustration of FIG. 5A). Such changing from an "on" signal switch two state 65 to an "off" signal switch two state 63 (as shown in 5C) occurring at the exact moment the variable-speed drive assembly 35 is moving at 1.0 feet per minute.

11. Based on the "off" signal switch two state 63 and "on" signal switch one state 66 output of the corresponding alignment detector 48, the variable-speed drive controller 39 selects from memory 44 and continuously furnishes to the corresponding span motor 38 a new fixed current speed 76 (as shown in FIG. 10B) that results in a 1.0 feet per minute speed of movement of the variable-speed drive assembly 35.

12. Subsequently, the evolved new fixed current speed 76 (as shown in FIG. 10B) that results in a 1.0 feet per minute speed of movement of the variable-speed drive assembly 35 maintains intermediate span 12 in both a non-lagging state of alignment 57 and a non-leading state of alignment 59 with intermediate span 13 (as shown in FIG. 4A) with steady state speeds of movement 78 (as shown in FIG. 8B).

In an implementation, one or more intermediate tower structures 30, 31 may be controlled by a suitable variable-speed drive assembly 35, or the like, to assist in traversing the irrigation system 1 over a respective ground surface, cultivation area or field. For example, each intermediate tower structure 30, 31 may include a variable-speed drive assembly 35 to propel the respective intermediate tower structure 30, 31 over a respective ground surface, cultivation area or field in either a forward movement direction 54 or a reverse movement direction 55. It should be noted that the system of the present invention does not require a variable-speed drive assembly 35 at the end tower structure 32 (i.e., end tower structure 32 does not require a variable-speed drive assembly 35 that includes an alignment detector 48; and, therefore, end tower structure 32 does not require either a switch one 40 or a switch two 41). End tower structure 32 can be controlled using a fixed-speed drive controller 37, a variable-speed drive controller 39, or by other means known in the art.

As described above and with reference to FIG. 2B, the variable-speed drive assembly 35 may incorporate one or more span motors 38 configured to drive the irrigation system 1 in a forward movement direction 54 or a reverse movement direction 55 based on the configuration of 3-phase supply power 67 conductor-L1 68, conductor-L2 69 and conductor-L3 70. In either a forward movement direction 54 or a reverse movement direction 55, the substantial straight alignment between each intermediate span 12, 13 and between the outermost intermediate span 13 and the end span 14 of the irrigation system 1 is maintained by the rotation of one or more cams 83, rotated by one or more rods 87, such cams 83 rotating against roller-actuating arm one 88 of a corresponding switch one 40 and roller-actuating arm two 89 of a corresponding switch two 41 of alignment detector 48 at each intermediate span 12, 13 flexible juncture (not shown) on intermediate tower structures 30, 31.

With reference to FIGS. 2B, 5A and 6A, assuming a forward movement direction 54, the switch one 40 is configured to signal either an "on" signal switch one state 66 (e.g., energized via normally closed switch one contact 80 closed to common switch one contact 82 to allow a forward direction signal 22 from incoming span cable 20 to pass through switch one 40 to variable-speed drive controller 39 as shown in upper illustration of FIG. 5A) or an "off" signal switch one state 62 (e.g., not energized via normally closed switch one contact 80 opened to common switch one contact 82 to prevent a forward direction signal 22 from incoming span cable 20 to pass through switch one 40 to variable-speed drive controller 39 as shown in lower illustration of FIG. 5A).

Again, with reference to FIGS. 2B, 5B and 6A, assuming a reverse movement direction 55, the switch one 40 is configured to signal either an "on" signal switch one state 66 (e.g., energized via normally opened switch one contact 81 closed to common switch one contact 82 to allow a reverse direction signal 23 from incoming span cable 20 to pass through switch one 40 to variable-speed drive controller 39 as shown in lower illustration of FIG. 5B) or an "off" signal switch one state 62 (e.g., not energized via normally opened switch one contact 81 opened to common switch one contact 82 to prevent a reverse direction signal 23 from incoming span cable 20 to pass through the switch one 40 to variable-speed drive controller 39 as shown in upper illustration of 5B).

Figure 6B:
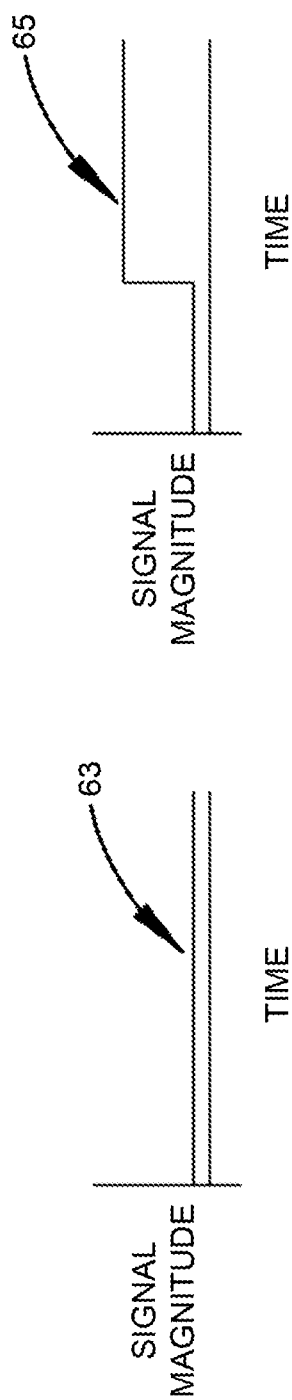
FIG. 6B is a graphical diagram illustrating the signal magnitudes of switch two of the irrigation system shown in FIG. 1B in accordance with an example implementation of the present invention.
Figure 7:
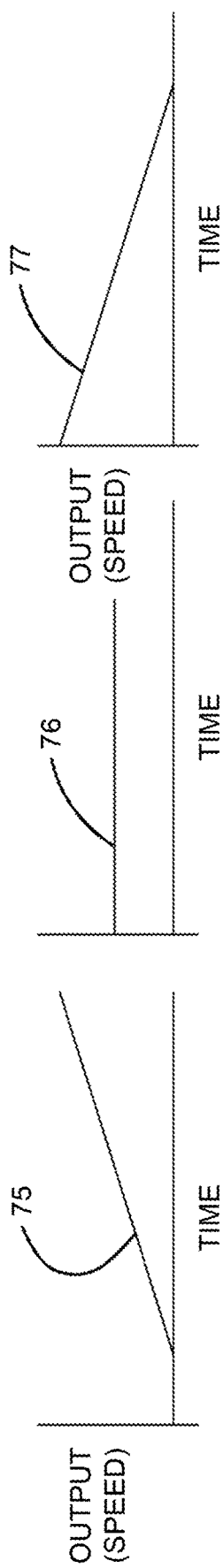
FIG. 7 is a graphical diagram illustrating a predetermined progressively increasing speed profile, a predetermined progressively decreasing speed profile, and a new fixed current speed of the variable-speed drive controller, such speed profiles and new fixed current speeds selected from memory and continuously furnished to the span motors of the irrigation system shown in FIG. 1B in accordance with an example implementation of the present invention.

With reference to FIGS. 2B, 5C and 6B, assuming a forward movement direction 54, the switch two 41 is configured to signal either an "off" signal switch two state 63 (e.g., not energized via normally opened switch two contact 85 opened to common switch two contact 86 to prevent a forward direction signal 22 from incoming span cable 20 to pass through switch two 41 to variable-speed drive controller 39 as shown in upper illustration of 5C) or an "on" signal switch two state 65 (e.g., energized via normally opened switch two contact 85 closed to common switch two contact 86 to allow a forward direction signal 22 from incoming span cable 20 to pass through switch two 41 to variable-speed drive controller 39 as shown in lower illustration of 5C).

Again, with reference to FIGS. 2B, 5D and 6B, assuming a reverse movement direction 55, the switch two 41 is configured to signal either an "on" signal switch two state 65 (e.g., energized via normally closed switch two contact 84 closed to common switch two contact 86 to allow a reverse direction signal 23 from incoming span cable 20 to pass through switch two 41 to variable-speed drive controller 39 as shown in upper illustration of 5D) or an "off" signal switch two state 63 (e.g., not energized via normally closed switch two contact 84 opened to common switch two contact 86 to prevent a reverse direction signal 23 from incoming span cable 20 to pass through switch two 41 to variable-speed drive controller 39 as shown in lower illustration of 5D).

With reference to FIGS. 2B, 4A, 4B and 5A in an embodiment with a forward direction signal 22, an "on" signal switch one state 66 (as shown in upper illustration of FIG. 5A) may be defined as any intermediate span 12, 13 being in a non-leading state of alignment 59 (as shown in FIGS. 4A and 4B) with one or more adjacent intermediate spans 12, 13 or end span 14 along a generally linear longitudinal axis (e.g., defined with respect to a generally horizontal surface, such as the ground). Similarly, with a forward direction signal 22, an "off" signal switch one state 62 (as shown in lower illustration of FIG. 5A) may be defined as any intermediate span 12, 13 being in a leading state of alignment 58 (as shown in FIG. 4B) with one or more adjacent intermediate spans 12, 13 or an end span 14 along a generally linear longitudinal axis (e.g., defined with respect to a generally horizontal surface, such as the ground).

With reference to FIGS. 2B, 4A, 4B and 5C in an embodiment with a forward direction signal 22, an "off" signal switch two state 63 (as shown in upper illustration of FIG. 5C) may be defined as any intermediate span 12, 13 being in a non-lagging state of alignment 57 (as shown in FIGS. 4A and 4B) with one or more adjacent intermediate spans 12, 13 or end span 14 along a generally linear longitudinal axis (e.g., defined with respect to a generally horizontal surface, such as the ground). Similarly, with a forward direction signal 22, an "on" signal switch two state 65 (as shown in lower illustration of FIG. 5C) may be defined as any intermediate span 12, 13 being in a lagging state of alignment 56 (as shown in FIG. 4B) with one or more adjacent intermediate spans 12, 13 or an end span 14 along a generally linear longitudinal axis (e.g., defined with respect to a generally horizontal surface, such as the ground).

With reference to FIGS. 2B, 4A, 4C and 5B in an embodiment with a reverse direction signal 23, an "off" signal switch one state 62 (as shown in upper illustration of FIG. 5B) may be defined as any intermediate span 12, 13 being in a non-leading state of alignment 59 (as shown in FIGS. 4A and 4C) with one or more adjacent intermediate spans 12, 13 or end span 14 along a generally linear longitudinal axis (e.g., defined with respect to a generally horizontal surface, such as the ground). Similarly, with a reverse direction signal 23, an "on" signal switch one state 66 (as shown in lower illustration of FIG. 5B) may be defined as any intermediate span 12, 13 being in a leading state of alignment 58 (as shown in FIG. 4C) with one or more adjacent intermediate spans 12, 13 or an end span 14 along a generally linear longitudinal axis (e.g., defined with respect to a generally horizontal surface, such as the ground).

With reference to FIGS. 2B, 4A, 4C and 5D in an embodiment with a reverse direction signal 23, an "on" signal switch two state 65 (as shown in upper illustration of FIG. 5D) may be defined as any intermediate span 12, 13 being in a non-lagging state of alignment 57 (as shown in FIGS. 4A and 4C) with one or more adjacent intermediate spans 12, 13 or end span 14 along a generally linear longitudinal axis (e.g., defined with respect to a generally horizontal surface, such as the ground). Similarly, with a reverse direction signal 23, an "off" signal switch two state 63 (as shown in lower illustration of FIG. 5D) may be defined as any intermediate span 12, 13 being in a leading state of alignment 58 (as shown in FIG. 4C) with one or more adjacent intermediate spans 12, 13 or an end span 14 along a generally linear longitudinal axis (e.g., defined with respect to a generally horizontal surface, such as the ground).

It is to be understood that in a separate embodiment the signal switch one states 62, 66 and signal switch two states 63, 65 could be configured in an opposite manner to the above discussion (not illustrated) for both a forward direction signal 22 and a reverse direction signal 23 without altering the disclosure.

More generally, it is to be understood that both the switch one 40 and switch two 41, of alignment detector 48, each essentially functions as a switch having two signal switch states (e.g., an "on" signal switch one state 66 and an "off" signal switch one state 62 and an "on" signal switch two state 65 and an "off" signal switch two state 63) to signal four distinct states of alignment of adjacent spans along a generally linear longitudinal axis. For example, the switch one 40 most commonly found on conventional center pivot irrigation systems may signal an "off" signal switch one state 62 when the intermediate spans 12, 13 are in a leading state of alignment 58, and may signal an "on" signal switch one state 66 when the intermediate spans 12, 13 are in a non-leading state of alignment 59. This could be reversed, so that the switch one 40 may signal an "on" signal switch one state 66 when the intermediate spans 12, 13 are in a lagging state of alignment 56, and may signal an "off" signal switch one state 62 when the intermediate spans 12, 13 are in a non-lagging state of alignment 57. Further, the switch two 41 of the present invention may signal an "off" signal switch two state 63 when the intermediate spans 12, 13 are in a non-lagging state of alignment 57, and may signal an "on" signal switch two state 65 when the intermediate spans 12, 13 are in a lagging state of alignment 56. This could be reversed, so that the switch two 41 may signal an "on" signal switch two state 65 when the intermediate spans 12, 13 are in a non-leading state of alignment 59, and may signal an "off" signal switch two state 63 when the intermediate spans 12, 13 are in a non-leading state of alignment 59. It is entirely a matter of design choice as to which switch one 40 and switch two 41 states correspond to an on or an off, a high or a low, a positive or a negative, etc., signal switch one 40 and switch two 41 states, respectively. In addition, it should be noted that the terms "leading", "lagging", "non-leading", and "non-lagging" are relative to the direction of rotation or movement direction 54, 55 of the intermediate spans 12, 13 at any particular time, since most conventional irrigation systems can be operated in either direction of movement 54, 55 under the control of the operator.

It is to be understood that in the system of the present invention the "on" signal switch one state 66 and "off" signal switch one state 62 may be signaled from one or more switches one 40, of alignment detector 48, each having two or more switch one 40 states and the "on" signal switch two state 65 and "off" signal switch two state 63 may be signaled from one or more switches two 41, of alignment detector 48, each having two or more switch two 41 states. Furthermore, it is to be understood that in the system of the present invention, the alignment detector 48 may include a single switch, configured to signal three or more signal switch states in-lieu-of both switch one 40 and switch two 41 of the alignment detector 48 disclosed herein. The present invention could also be implemented using any type of alignment detector 48, that comprises a switch one 40 and a switch two 41, a plurality of switches one 40 and switches two 41, an analog sensor 47 (e.g., a potentiometer) or a plurality of analog sensors 47, to detect and output the state of alignment of the intermediate spans 12, 13 and end span 14.

In an embodiment of the present invention, the variable-speed drive controller 39 monitors and processes the signal switch one states 62, 66 and signal switch two states 63, 65 of the corresponding alignment detector 48 and, based on combinations of such signal switch one states 62, 66 and signal switch two states 63, 65, selects from memory 44 and continuously furnishes to the corresponding span motor 38 a predetermined progressively increasing speed profile 75, a predetermined progressively decreasing speed profile 77, or a new fixed current speed 76.

In particular, as shown in FIGS. 10A, 10B, 10C and 10D, the variable-speed drive controller 39 selects from memory 44 and continuously furnishes to the corresponding span motor 38 a predetermined progressively increasing speed profile 75, a predetermined progressively decreasing speed profile 77, or a new fixed current speed 76 so as to maintain substantial straight alignment of the respective longitudinal axes of the intermediate spans 12, 13 and end span 14 as previously discussed.

Figure 3B:
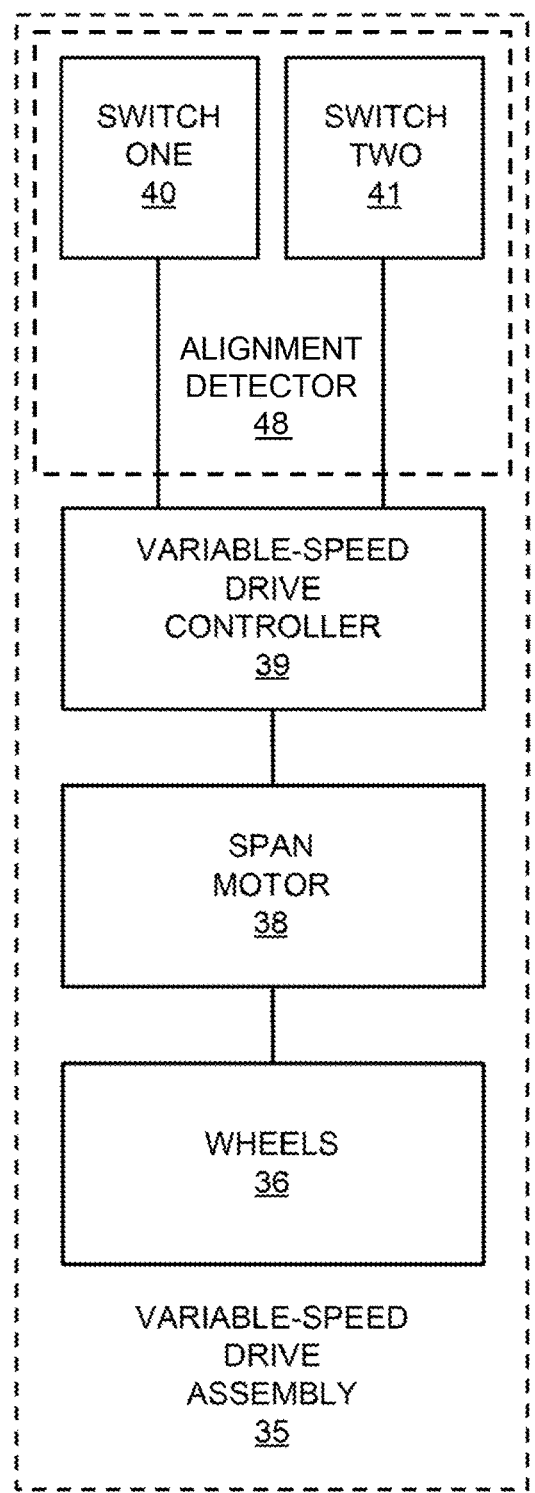
FIG. 3B is a block diagram illustrating the selected elements of the variable-speed drive assembly of the irrigation system shown in FIG. 1B in accordance with an example implementation of the present invention.
Figure 3C:
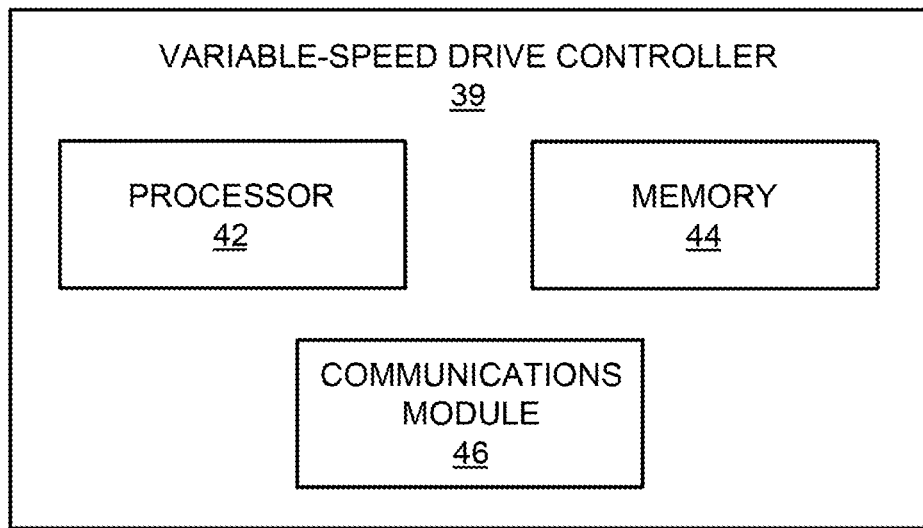
FIG. 3C is a block diagram illustrating the selected elements of the variable-speed drive controller of the irrigation system shown in FIG. 1B in accordance with an example implementation of the present invention.
Figure 3D:
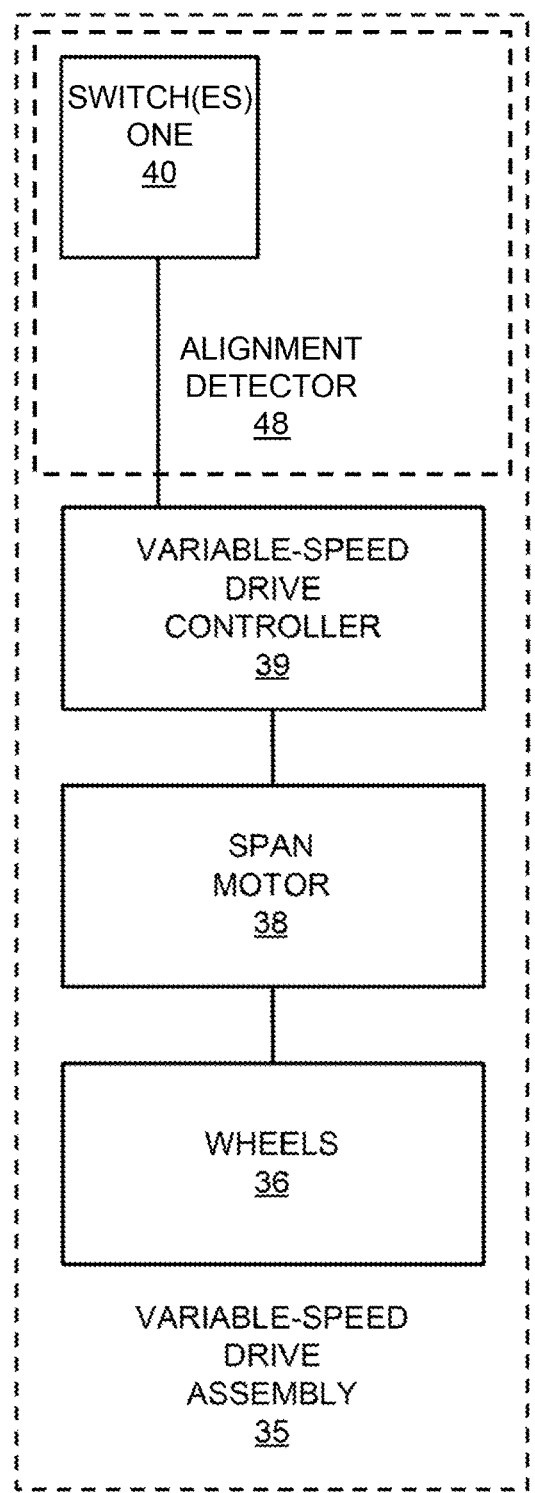
FIG. 3D is a block diagram illustrating the selected elements of the variable-speed drive assembly of the irrigation system shown in FIG. 1B in accordance with an example implementation of the present invention.

In a preferred embodiment and as shown in FIG. 3C, the variable-speed drive controller 39 may include a processor 42 configured to provide processing for signal switch one states 62, 66 and signal switch two states 63, 65 data and, in turn, select from memory 44 and continuously furnish to the corresponding span motor 38 a predetermined progressively increasing speed profile 75, a predetermined progressively decreasing speed profile 77, or a new fixed current speed 76.

Thus, the processor 42 may execute one or more control logic programs and/or instructions described herein. The variable-speed drive controller 39 may also include a memory 44, which is an example of tangible computer-readable media that provides storage functionality to store various data associated with the operation of the variable-speed drive controller 39, such as software programs/modules and code segments mentioned herein, or other data to instruct the processor 42 to perform the steps described herein. Finally, the variable-speed drive controller 39 may include a communications module 46, which is configured to communicate with other components of variable-speed drive assembly 35 (e.g., span motors 38, switch one 40, switch two 41 (as in FIG. 2B)) over a communication network (e.g., a wireless network, a wired network, etc.). For example, the communications module 46 of variable-speed drive controller 39 may be directly coupled (e.g., connected via one or more wires, or the like) to a corresponding switch one 40 and switch two 41 of alignment detector 48 and to the corresponding span motor 38 of variable-speed drive assembly 35. The communications module 46 may be representative of a variety of communication components and functionality, including, but not limited to, one or more antennas, a transmitter and/or receiver, a transceiver, or the like.

As described above and with reference to FIG. 1B, the irrigation system 1 may include one or more variable-speed drive assemblies 35 at an intermediate tower structure 30, 31. Each variable-speed drive assembly 35 may include one or more span motors 38. A non-limiting list of suitable span motor 38 types includes a magnetic electric motor, an electrostatic electric motor, a piezoelectric electric motor, a self-commutated DC (direct current) motor, a DC SRM (switched reluctance motor), a DC variable reluctance motor, a stepper motor, an AC (alternating current) asynchronous induction motor, or an AC synchronous reluctance motor, and the like.

As shown in FIGS. 2B and 3B, each variable-speed drive assembly 35 may include a variable-speed drive controller 39. A non-limiting list of suitable variable-speed drive controller 39 types includes an AC (alternating current) VFD (variable frequency drive), a variable-torque V/Hz (volts-per-hertz) control VFD, a flux control VFD, a DTC (direct torque control) VFD, a sensorless vector control VFD, a sensored vector control VFD, a brush type DC (direct current) variable-drive control unit, or a DC variable-drive control unit, and the like, all with or without an internal or an external microcontroller or an internal or an external PLC (programmable logic controller).

While FIG. 2B illustrates that the variable-speed drive controller 39 is incorporated inside (e.g., housed within) the variable-speed drive assembly 35, it is to be understood that the variable-speed drive controller 39 may be a standalone unit. Furthermore, the elements of processor 42, memory 44 and communications module 46 of variable-speed drive controller 39 could each be standalone and not configured to be incorporated inside (e.g., housed within) the variable-speed drive controller 39 as shown in FIG. 3C.

As shown in FIG. 3B, the variable-speed drive controller 39 is directly connected with the respective switch one 40 and switch two 41 (e.g., via a wired connection) of alignment detector 48. A non-limiting list of suitable switch one 40 and switch two 41 types includes a single-pole, double-throw (SPDT) switch (as illustrated by switch one 40 in FIGS. 2A, 2B, 5A and 5B and as illustrated by switch two 41 in FIGS. 2B, 5C and 5D), a micro switch, a limit switch, a biased switch, a rotary switch, a toggle switch, a magnetic switch, a reed switch, a mercury switch, a compass switch, a photo infrared switch, a motion switch, a Hall-effect switch, a capacitance switch, an induction switch, a digital encoder switch, a position resolver switch, a guided wire switch, a GPS (global positioning system) based alignment switch, a laser based alignment switch, a non-contact proximity switch, and the like. In this implementation, the variable-speed drive controller 39 is also directly connected to the respective span motor 38 (e.g., via a wired connection).

Figure 3E:
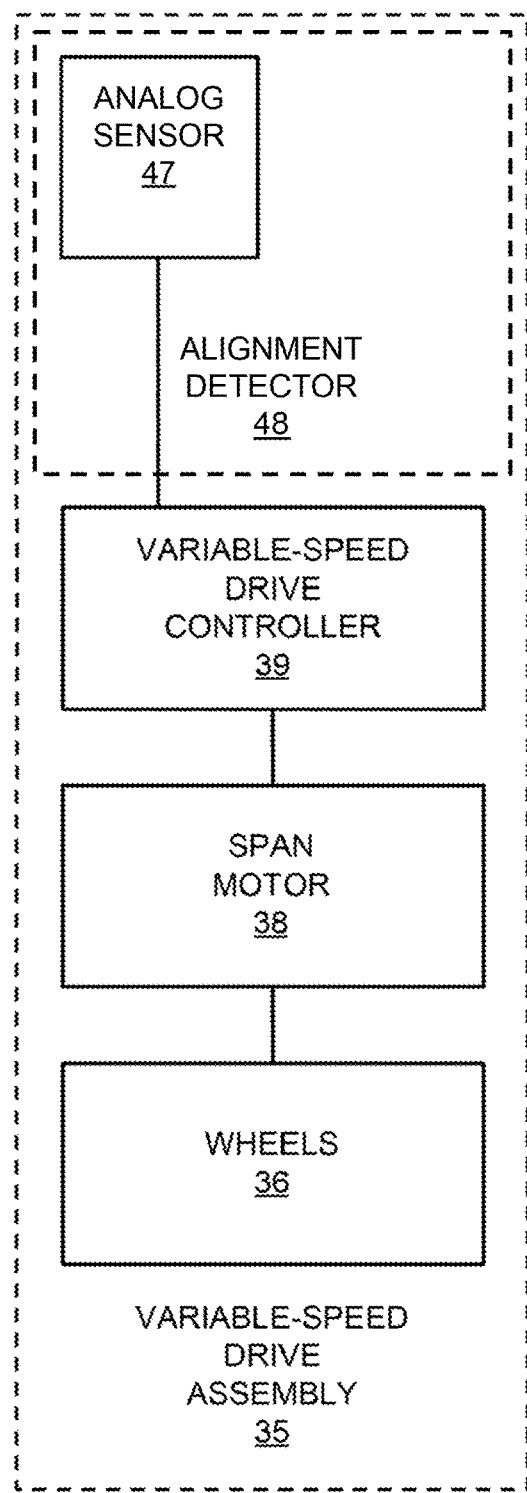
FIG. 3E is a block diagram illustrating the selected elements of the variable-speed drive assembly of the irrigation system shown in FIG. 1B in accordance with an example implementation of the present invention.
Figure 3F:
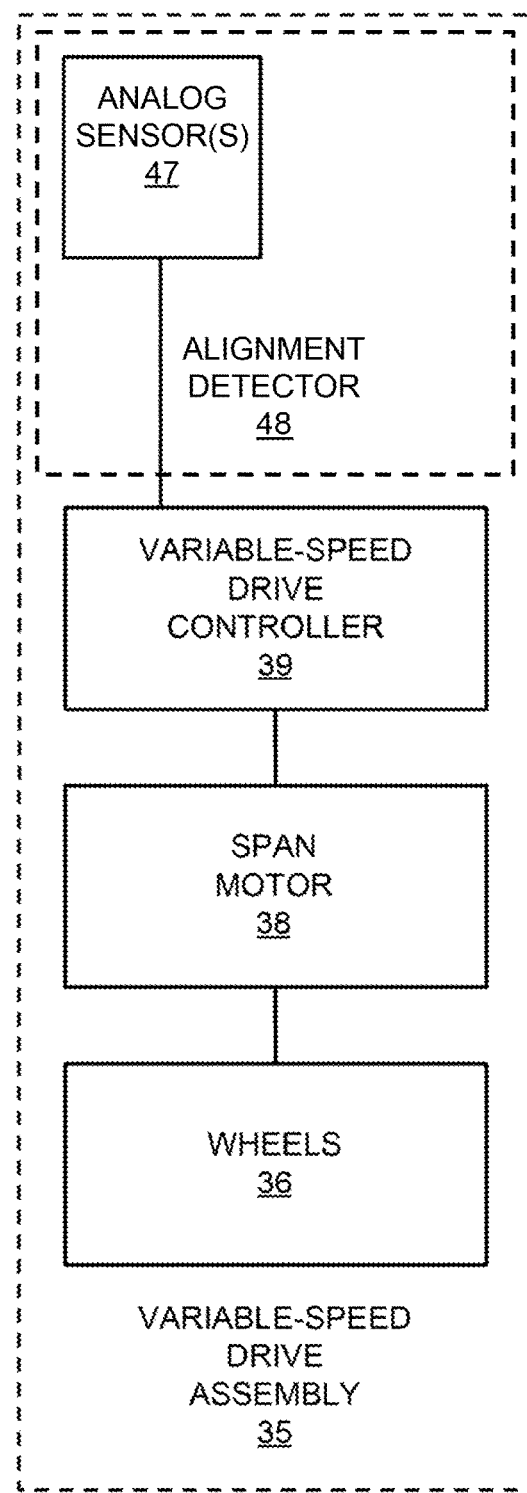
FIG. 3F is a block diagram illustrating the selected elements of the variable-speed drive assembly of the irrigation system shown in FIG. 1B in accordance with an example implementation of the present invention.

As shown in FIGS. 3E and 3F, the variable-speed drive controller 39 is directly connected with the respective analog sensor 47 (e.g., via a wired connection) of the alignment detector 48. A non-limiting list of suitable analog sensor 47 types includes a potentiometer, a captive alignment sensor, a laser based alignment sensor, a non-contact proximity sensors, or any other device capable of signaling at least three distinct states of alignment, and the like. In this implementation, the variable-speed drive controller 39 is also directly connected to the respective span motor 38 (e.g., via a wired connection).

In an embodiment and as shown in FIGS. 2B and 3B, switch one 40 and switch two 41, of alignment detector 48, are each in communication with a respective variable-speed drive controller 39. Conventionally and with reference to FIGS. 5A, 5B, 5C and 5D, switch one 40 and switch two 41 each may be actuated, but in opposite manners, respectively, by the movement of a cam 83 (shown in FIG. 2B) on a shaft connected to a corresponding rod 87 associated with a corresponding intermediate span 12, 13.

Conventionally, selection of either a forward movement direction 54 or a reverse movement direction 55 by operators of irrigation system 1 using a central control panel (not shown) at center pivot point structure 2 or a remote control system (not shown) at one or more intermediate tower structures 30, 31 or end tower structure 32 determines whether the forward direction signal 22 or the reverse direction signal 23 (shown in FIGS. 2B, 5A, 5B, 5C and 5D) is present (i.e., carrying either a forward direction signal 22 or a reverse direction signal 23 through both switch one 40 using normally closed switch contact 80, normally opened switch contact 81, and common switch contact 82 and switch two 41 using normally closed switch contact 84, normally opened switch contact 85, and common switch contact 86), such switch one 40 and switch two 41 may be conventional (e.g., single-pole, double-throw (SPDT) switch also sometimes referred to as a limit switch or a micro switch).

In an embodiment of the present invention and with reference to FIGS. 2A, 4A, 4B and 4C, the conventional alignment detector 48, that may include a switch one 40 with a roller-actuating arm one 88 and the corresponding actuating rod 87 and cam 83, is already included and configured in the installed base of existing electric powered irrigation systems 1. As such, the basic elements of the alignment systems of the prior art can be readily used by the system of the present invention to indicate a lagging state of alignment 56, a non-lagging state of alignment 57, a leading state of alignment 58, or a non-leading state of alignment 59 between the corresponding intermediate spans 12, 13 and the end span 14 for a movement direction 54, 55.

In one or more implementations and with reference to FIGS. 4A, 4B, 4C, 5A and 5B, each switch one 40 when actuated or not actuated may be configured to indicate when a respective intermediate span 12, 13 is in a lagging state of alignment 56, a non-lagging state of alignment 57, a leading state of alignment 58, or a non-leading state of alignment 59.

In one or more implementations and with reference to FIGS. 4A, 4B, 4C, 5C and 5D, each switch two 41 when actuated or not actuated may be configured to indicate when a respective intermediate span 12, 13 is in a lagging state of alignment 56, a non-lagging state of alignment 57, a leading state of alignment 58, or a non-leading state of alignment 59.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

We claim:

1. An irrigation system having a movement direction over a ground surface of a field, the irrigation system comprising:
a plurality of spans, each having a longitudinal axis, said plurality of spans being connected at a flexible juncture and having a state of alignment of the respective longitudinal axes of the plurality of spans;
an intermediate tower structure between the plurality of spans configured to support the plurality of spans above the ground surface;
a variable-speed drive assembly of the intermediate tower structure having a wheel configured to contact the ground surface below the irrigation system, a span motor configured to drive the wheel so as to propel the intermediate tower structure over the ground surface, a variable-speed drive controller controlling the speed of the span motor, and an alignment detector to detect and output the state of alignment of the respective longitudinal axes of the plurality of spans indicating: (a) a lagging state of misalignment; (b) a leading state of misalignment; or (c) a state of alignment that is neither lagging nor leading; and
said variable-speed drive controller monitoring and processing the output of the alignment detector and based on the state of alignment detected by the alignment detector configured to: (a) increase the speed over time of the span motor using a predetermined increasing speed profile continuing while in the lagging state of misalignment, regardless of magnitude of the misalignment; (b) decrease the speed over time of the span motor using a predetermined decreasing speed profile continuing while in the leading state of misalignment, regardless of magnitude of the misalignment; and (c) maintain the current speed of the span motor while in the state of alignment that is neither lagging nor leading, to thereby maintain substantial straight alignment of the respective longitudinal axes of the plurality of spans.

2. The system for claim 1 wherein the alignment detector comprises an analog sensor.

3. The system of claim 1 wherein the alignment detector comprises a potentiometer.

4. The system of claim 1 wherein the alignment detector comprises a plurality of switches.

5. The system of claim 1 wherein the alignment detector comprises a capacitive displacement sensor.

6. The system of claim 1 wherein the alignment detector comprises a strain gauge sensor.

7. The system of claim 1 wherein the alignment detector comprises a non-contact proximity sensor.

8. The system of claim 1 wherein the alignment detector comprises a captive alignment sensor.

9. The system of claim 1 wherein the alignment detector comprises a laser-based alignment sensor.

10. An irrigation system having a movement direction over a ground surface of a field, the irrigation system comprising:
a plurality of spans, each having a longitudinal axis, said plurality of spans being connected at a flexible juncture and having a state of alignment of the respective longitudinal axes of the plurality of spans;
an intermediate tower structure between the plurality of spans configured to support the plurality of spans above the ground surface;

a variable-speed drive assembly of the intermediate tower structure having:
(a) a wheel configured to contact the ground surface below the irrigation system;
(b) a span motor configured to drive the wheel so as to propel the intermediate tower structure over the ground surface;
(c) a variable-speed drive controller controlling the speed of the span motor; and
(d) an alignment detector configured to detect and output the state of alignment of the respective longitudinal axes of the plurality of spans indicating: (i) a lagging state of misalignment; (ii) a leading state of misalignment; or (iii) a state of alignment that is neither lagging nor leading;

said variable-speed drive controller monitoring and processing the output of the alignment detector and based on the state of alignment detected by the alignment detector configured to: (a) vary aspects of the supply power furnished to the span motor using a predetermined increasing speed profile to continue to increase the speed over time of the span motor while in the lagging state of misalignment, regardless of magnitude of the misalignment; (b) vary aspects of the supply power furnished to the span motor using a predetermined decreasing speed profile to continue to decrease the speed over time of the span motor while in the leading state of misalignment, regardless of magnitude of the misalignment; and (c) maintain the current speed of the span motor achieved at the moment a change to the state of alignment that is neither lagging nor leading is detected, to thereby evolve a speed of the span motor that maintains substantial straight alignment of the respective longitudinal axes of the plurality of spans.

\* \* \* \* \*